US012166821B2

(12) United States Patent
Brown et al.

(10) Patent No.: US 12,166,821 B2
(45) Date of Patent: Dec. 10, 2024

(54) DATA EXCHANGE AND COMPUTER-IMPLEMENTED CREDITING PROTOCOL

(71) Applicant: LIFETIME HEALTH AND TRANSPORTATION SERVICE LLC, Cincinnati, OH (US)

(72) Inventors: Pierre Brown, Florence, KY (US); Cyoni Brown, Florence, KY (US); Skyy Brown, Florence, KY (US); Kali Brown, Florence, KY (US); Omni Brown, Florence, KY (US); Troy Nunnally, Atlanta, GA (US); Travis Nunnally, Atlanta, GA (US)

(73) Assignees: Pierre Brown, Florence, KY (US); Latonya Smith, Florence, KY (US)

( * ) Notice: Subject to any disclaimer, the term of this patent is extended or adjusted under 35 U.S.C. 154(b) by 0 days.

(21) Appl. No.: 18/442,198

(22) Filed: Feb. 15, 2024

(65) Prior Publication Data

US 2024/0275847 A1    Aug. 15, 2024

Related U.S. Application Data

(63) Continuation of application No. PCT/US2024/015166, filed on Feb. 9, 2024.
(Continued)

(51) Int. Cl.
*H04L 67/1095* (2022.01)
*G06Q 10/0639* (2023.01)
(Continued)

(52) U.S. Cl.
CPC ..... *H04L 67/1095* (2013.01); *G06Q 10/0639* (2013.01); *H04L 9/3236* (2013.01);
(Continued)

(58) Field of Classification Search
None
See application file for complete search history.

(56) References Cited

U.S. PATENT DOCUMENTS

| 8,719,179 | B2 * | 5/2014 | Bonmassar | ......... G06F 3/04842 |
| | | | | 705/320 |
| 9,053,157 | B2 * | 6/2015 | Ali | ..................... G06Q 10/1053 |
| (Continued) |

FOREIGN PATENT DOCUMENTS

| CN | 113627797 A | 11/2021 |
| CN | 114519555 A | 5/2022 |

(Continued)

OTHER PUBLICATIONS

International Search Report and Written Opinion issued May 22, 2024, in PCT/US2024/015166, 11 pages.

*Primary Examiner* — Lashonda Jacobs-Burton
(74) *Attorney, Agent, or Firm* — Vorys, Sater, Seymour and Pease LLP; Michael Messinger

(57) ABSTRACT

System and method for data exchange. A system includes a host implemented on at least one processor and configured to synchronize employee performance data obtained from multiple employers over a data network. A client device includes an application configured to communicate with the host and enable a requestor to access an employee performance report. The host is further configured to enable the requestor using the application on the client device to query or search for an employee performance report. The host may include an application programming interface (API) gateway configured to communicate with the client device and a blockchain network having multiple nodes managed by different employers. In one example, the employee performance data includes a score.

21 Claims, 13 Drawing Sheets

Related U.S. Application Data

(60) Provisional application No. 63/444,680, filed on Feb. 10, 2023.

(51) Int. Cl.
*H04L 9/00* (2022.01)
*H04L 9/32* (2006.01)
*H04L 9/40* (2022.01)

(52) U.S. Cl.
CPC .......... *H04L 9/50* (2022.05); *G06Q 2220/00* (2013.01); *G06Q 2220/10* (2013.01); *H04L 9/3239* (2013.01); *H04L 63/105* (2013.01)

(56) References Cited

U.S. PATENT DOCUMENTS

| | | | |
|---|---|---|---|
| 10,832,220 B2* | 11/2020 | Whitney | G06Q 10/1053 |
| 11,132,644 B2* | 9/2021 | Innes | G06Q 10/063112 |
| 11,157,876 B1 | 10/2021 | Knas et al. | |
| 11,170,346 B2 | 11/2021 | Tummuru et al. | |
| 11,494,863 B2 | 11/2022 | Wray et al. | |
| 2008/0140680 A1* | 6/2008 | Hyder | G06Q 10/00 |
| 2012/0005113 A1* | 1/2012 | Kotis | G06Q 10/1053 |
| | | | 705/321 |
| 2014/0129573 A1* | 5/2014 | deWaal | G06Q 10/105 |
| | | | 709/204 |
| 2015/0278820 A1* | 10/2015 | Meadows | G10L 25/48 |
| | | | 705/64 |
| 2016/0063442 A1 | 3/2016 | Bennett et al. | |
| 2018/0082256 A1 | 3/2018 | Tummuru et al. | |
| 2019/0050832 A1* | 2/2019 | Wright | H04L 9/0637 |
| 2019/0052454 A1* | 2/2019 | Wright | G06Q 20/36 |
| 2019/0066023 A1* | 2/2019 | Von Jan | G06F 16/337 |
| 2019/0114593 A1 | 4/2019 | Champaneria | |
| 2019/0156291 A1* | 5/2019 | Nayak | H04L 9/3239 |
| 2019/0188399 A1* | 6/2019 | Palaniappan | H04L 9/0618 |
| 2019/0228369 A1 | 7/2019 | Duval-Igarta | |
| 2019/0279160 A1* | 9/2019 | Whitney | H04L 9/0643 |
| 2020/0005213 A1 | 1/2020 | Clemens | |
| 2020/0098072 A1 | 3/2020 | Escobar | |
| 2020/0311682 A1* | 10/2020 | Olshansky | G06V 20/40 |
| 2020/0382509 A1* | 12/2020 | Easwar Prasad | H04L 63/08 |
| 2021/0150485 A1* | 5/2021 | Ghosh | G06F 16/9535 |
| 2021/0150486 A1 | 5/2021 | Ghosh et al. | |
| 2021/0319379 A1 | 10/2021 | Martinez et al. | |
| 2021/0342787 A1* | 11/2021 | Williams | G06Q 10/1053 |
| 2022/0012672 A1* | 1/2022 | Inman | G06Q 10/1053 |
| 2022/0114564 A1* | 4/2022 | Wright | H04L 9/3073 |
| 2022/0215346 A1 | 7/2022 | Miller et al. | |
| 2022/0327459 A1* | 10/2022 | Quinones | G06Q 10/0637 |
| 2022/0391850 A1 | 12/2022 | Morris | |

FOREIGN PATENT DOCUMENTS

| | | |
|---|---|---|
| KR | 10-2018-0118611 A | 10/2018 |
| KR | 20200083210 A | 7/2020 |
| KR | 20200092486 A | 8/2020 |
| WO | 2017112914 A2 | 6/2017 |
| WO | 2017153495 A1 | 9/2017 |

* cited by examiner

```
# Given category scores
scores = {
    "Work History and Career Progression": 80,
    "Skills and Competencies": 85,
    "Attendance and Punctuality": 90,
    "Professionalism and Conduct": 88,
    "Work Performance and Quality": 92,
    "Productivity Metrics": 87,
    "Industry-specific Metrics": 90
}

# Given weights for each category
weights = {
    "Work History and Career Progression": 0.15,
    "Skills and Competencies": 0.15,
    "Attendance and Punctuality": 0.10,
    "Professionalism and Conduct": 0.10,
    "Work Performance and Quality": 0.20,
    "Productivity Metrics": 0.15,
    "Industry-specific Metrics": 0.15
}

# Calculate Total Weighted Score
total_weighted_score = sum(score[category] * weights[category] for category in scores)

# Maximum possible TWS assuming a perfect score of 100 in each category
max_possible_tws = sum(100 * weight for weight in weights.values())

# Rescale the Total Weighted Score to the 300-850 range
adjusted_score = 300 + (total_weighted_score / max_possible_tws) * 550 total_weighted_score, adjusted_score
```

*FIG. 9*

DATA EXCHANGE AND COMPUTER-IMPLEMENTED CREDITING PROTOCOL

RELATED APPLICATION

This application is a by-pass continuation application of International Application No. PCT/US2024/15166, filed Feb. 9, 2024, entitled "DATA EXCHANGE AND COMPUTER-IMPLEMENTED CREDITING PROTOCOL", which is based on and claims priority to U.S. Provisional Patent Application No. 63/444,680, filed Feb. 10, 2023, entitled "DATA EXCHANGE AND COMPUTER-IMPLEMENTED CREDITING PROTOCOL", each of which is incorporated herein by reference in its entirety.

FIELD OF THE DISCLOSURE

This disclosure relates generally to computer-implemented data services and system.

BACKGROUND OF THE DISCLOSURE

In today's labor market companies (employers) and their employees have a give and take relationship, where the proper exchange of value is not being realized. There is a mismatch of employee performance and company standards. If employees aren't performing at a company's standard by which the employees were hired it can cost companies greatly beyond just simply rehiring for the position. Risks involved in hiring, such as customer losses, management frustrations, training budgets exceeding expectations due to retention problems (or budget overruns) all can stem from a company's bet on the potential of its employees. Because essentially that's what hiring is, placing a bet and taking a chance on someone. To mitigate this risk, innovative tools are needed. With labor scarcity, people seeking new employment have leverage and are being incentivized to join companies like never before. But this doesn't ensure that value is being exchanged. If people are hired just because there's a vacancy, such people may underperform, and the quality of goods & services being provided may decline. In short, without any assurances hiring just to keep a business open may be the reason it closes. Currently there's no real way to leverage the hiring process due to a lack of system protocols for employee accountability and record keeping. There is no protocol for employee accountability and record keeping.

Furthermore, employees have no real way to leverage their work capabilities and job experience to their benefit, as well as the benefit of a potential employer. When starting a new career most people use their resume to represent what these people have to offer a company. But the validity of resumes has been on a decline for years. This process is dated and needs modification for a future of accuracy and accountability within the global workforce. Employees may add a specific value to a company but it's not being quantified, validated and stored. If it were then it becomes transferable and can serve as a value proposition for the employee's life cycle, rather they remain employed by the issuing employer or not. There is no protocol for validating resumes and there exists a need for a more accurate and accountable system for employees.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment, a system includes a host implemented on at least one processor and configured to synchronize employee performance data obtained from multiple employers over a data network. A client device is coupled to the host. The client device includes an application configured to communicate with the host and enable a requestor to access an employee performance report.

In a further embodiment, employee performance data includes a score.

In other embodiments, the host is further configured to enable the requestor using the application on the client device to query or search for an employee performance report. The host includes an application programming interface (API) gateway. The API gateway is configured to communicate with the client device and a blockchain network having multiple nodes managed by different employers.

In another embodiment, a computer-implemented method for managing employment history on a cloud computing platform is provided.

In yet another embodiment, a system for implementing the method of managing employment history on a cloud computing platform is provided.

In a further embodiment, a non-transitory computer-readable medium system is provided for storing machine-readable instructions, which when executed by a processor of an electronic device, cause the electronic device to managing employment history on a cloud computing platform.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims

BRIEF DESCRIPTION OF THE DRAWINGS

Embodiments are described with reference to the accompanying drawings. In the drawings, like reference numbers can indicate identical or functionally similar elements. The drawing in which an element first appears is generally indicated by the left-most digit in the corresponding reference number.

FIG. 9 is an example of a portion of pseudocode for computing an employee performance score.

DETAILED DESCRIPTION

Figure 1:
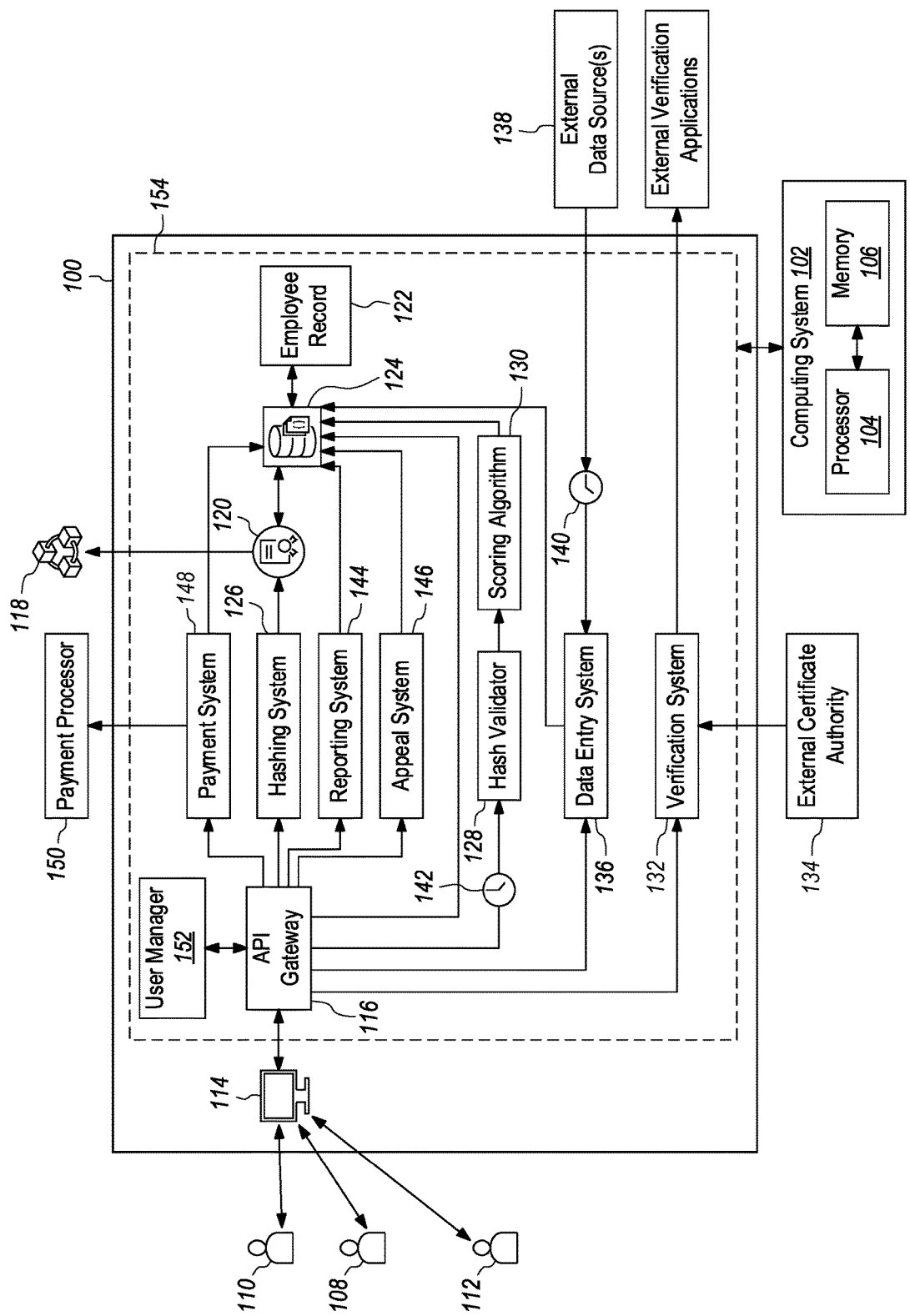
FIG. 1 is an example of a block diagram of a data exchange system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Examples are disclosed herein relating to managing an exchange of data between one or more devices. Example devices can include, but not limited to, a computer (e.g., a stationary computer), a portable device (e.g., a laptop computer, a tablet, a mobile phone, etc.), and a dedicated device. According to one or more examples of the present disclosure, a data exchange system is disclosed. The data exchange system can function as a digital platform for exchanging data between devices, and in some instances facilitate trading of the data. Tradable data as used herein can refer to a digital record for an employee. The digital record can include information characterizing an employee behavior and in some instances its impact on a workforce. The digital record is a digital recording of behaviors of one or more employees that affect others, rather directly or indirectly progressive or regressive helpful or harmful within a private and public domain of goods and services (e.g., the global workforce). This consensus of a tradable data exchange between employers within an industry and across industries of basic, yet crucial information will be an invaluable asset and will give a more accurate indication to the potential of future employees.

In some examples, the data exchange system can be configured to allow for reporting, monitoring, score and exchanging of employee job performances between devices or computers. In some examples, the data exchange system is implemented as machine-readable instructions that can be carried out on a cloud-computing system. The cloud-computing system can be configured to allow employers to report, monitor, and exchange employees' job performances and work behaviors. Allowing employees to transfer their value and experiences from one place to another creates leverage for salary requests, promotions, and job offers with a validated and verifiable track record.

For example, employers can create an account and enroll each member of their staff onto the system. Enrollment can include but is not limited to the employee's first and last name, social security number, copy of ID, start date, position and wage. Once enrolled, the system prompts the employer to routinely enter data on each employee in categories provided by the app. Categories can include but are not limited to attendance, productivity, professionalism and work performance. Based on the information reported in each category by the employer, a scoring algorithm of the system can generate an employee performance score for each enrolled employee.

This score alongside a person's employment history can be made available by the system in a report. Each report can be stored and distributed on a blockchain. In order to receive the report and access a person's employment data, interested parties (referred to as requestors herein) such as potential employers, agencies or private entities can pay a fee. Each company that provides/submits information on its employees can be referred to herein as data providers. All data providers own the information submitted to the system (or platform), therefore when the report is requested by the requestor, all contributing parties can be compensated. Once the fee is paid a requesting party can receive the report.

The system provides a single hub where work history and job performances can be shared between employers with security and accuracy can be used to improve an efficiency of a hiring process. The system can be used to eliminate time consuming and sometimes inaccurate protocols for employment verification and serves as a validation for potential employee resumes. Furthermore, because the system scores an employee's work history and performance this creates accountability within the workforce and labor market and weeds out nonproductive and problematic candidates while highlighting higher quality highly skilled performers. Leveraging their experience through the employee performance score allows employees to attain more fitting salaries, better compensation packages and higher wages.

FIG. 1 is an example of a block diagram of a data exchange system 100. The system 100 can be used for exchanging employee performance data (also can be referred to as workforce data) between a client 114 of one or more users, which can include an employer 108, and employee 110, and requestor 112. The employee performance data can include one or more data points from an employee record 122, such as disclosed herein. The employee performance data can be provided in a report to a user. In some examples, the employee performance data is the employee record 122. The employee record 122 can be referred to as a tradable data record as information or data within this record can be traded (e.g., purchased) for a fee.

The system 100 includes a client 114 and host 154. The system 100 can be used to allow each employer to report, monitor, and exchange the employee performance data while allowing employees to transfer their value and experiences efficiently in a high data integrity approach. The term "high data integrity approach" refers to one or more strategies, practices, and/or technologies aimed at ensuring an accuracy, consistency, and/or reliability of data throughout a lifecycle. The host 154 can be configured to synchronize employee performance data across various organizations and/or regions by leveraging a decentralized blockchain network and storage solutions. Additionally, the host 154 can be configured to utilize certificate authorities to validate identities of employers, requestors, employees, and/or system administrators.

The host 154 can be implemented using one or more modules, shown in block form in the drawings. The one or more modules can be in software or hardware form, or a combination thereof. In some examples, one or more functions of the host 154 can be implemented as machine readable instructions for execution on a computing system 102, as shown in FIG. 1. The computing system 102 can include one or more computing devices selected from, for example, a desktop computer, a server, a controller, a blade, a mobile phone, a tablet, a laptop, a personal digital assistant (PDA), and the like. The computing system 102 can include a processor 104 and a memory 106. By way of example, the memory 106 can be implemented, for example, as a non-transitory computer storage medium, such as volatile memory (e.g., random access memory), non-volatile memory (e.g., a hard disk drive, a solid-state drive, a flash memory, or the like), or a combination thereof. The processor 104 can be implemented, for example, as one or more processor cores. The memory 106 can store machine-readable instructions that can be retrieved and executed by the processor 104 to implement one or more functions of the host 154. Each of the processor 104 and the memory 106 can be implemented on a similar or a different computing system.

In some examples, the computing system 102 can be implemented in a cloud computing environment (for example, as disclosed herein) and thus on a cloud infrastructure. In such a situation, features of the computing system 102 can be representative of a single instance of hardware or multiple instances of hardware executing across the multiple of instances (e.g., distributed) of hardware (e.g., computers, routers, memory, processors, or a combination thereof). In some examples, the computing system 102 can be implemented on a single dedicated server or workstation. In an embodiment, the computing system 102 coupled to a database may be implemented in an architecture distributed over one or more networks, such as, for example, a cloud computing architecture. Cloud computing includes but is not limited to distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), application programming interface as a service (APIaaS), or an integration platform as a service (IPaaS). The database for example can be a database platform running database management software available from an organization such as a commercial vendor or open source community. The database can be used to store one or more types of data, as disclosed herein.

In some examples, the host 154 can be accessed or used by a number of different user types. The user types can include an employer 108, an employee 110 and a requestor 112. Each of the different users can access the host 154 using the client 114. While the example of FIG. 1 illustrates different users accessing the host 154 through the client 114, it is to be understood that, in some examples, each user can be provided with a unique or its own client for accessing and interacting with the host 154. In some examples, the client 114 is a dedicated application, while in other examples, a web browser is used as the client 114 for interacting with the host 154. For example, the client 114 for the employer 108 can be representative of an employer-side application that enables the employer 108 to interface and interact with the host 154. The client for the requestor 112 can be a requestor-side application that enables the requestor 112 to receive an employee performance score and/or an employee performance report, as disclosed herein. The client 114 can be carried out on a device, such as disclosed herein. Thus, the client 114 can correspond to a software application that can be installed on a device of the user. The software application can provide one or more user interfaces for interacting via the host 154 with a blockchain network, external decentralized storage, and external certificate authorities (ECAs), as disclosed herein. The client 114 can be used for one or more operations or actions, for example, registering with the host 154, accessing employment performance data (or an employee record 122), submitting data updates to the host (e.g. creating, adding, or deleting data in the employee record 122, providing new employment performance data for the employee record 122), or accessing reports generated by the host 154.

Employers, such as the employer 108, can be businesses, organizations, or individuals who hire and manage one or more employees, such as the employee 110, as shown in FIG. 1. Employers can range from small business owners to human resource (HR) managers in large corporations. Employers can use the employer-side application to enroll their employees, update employee performance data for the employee 110 in the employee record 122, and access one or more reports generated by the host 154 for both current and potential future hires. Employers play a role in inputting data into the host 154 and can utilize the host 154 for making hiring and management decisions.

Employees, such as the employee 110, can be individuals working for an employer who are enrolled in the host 154. Employees can encompass a wide range of roles and/or industries, each with unique performance metrics. Employees can interact with the host 154 (e.g., through the client 114) to view their own performance data and scores. In some examples, the employee 110 can interact with the host 154 to understand how the employee 110 is evaluated and to appeal or correct any inaccuracies in the employee record 122. The host 154 can be configured to allow the employee 110 to review personal performance reports, update personal details, and/or engage with an appeal system, as disclosed herein, for data accuracy.

Requestors, such as the requestor 112, can be entities or individuals who seek access to an employee performance report, such as for the employee 110. Requestors can include potential employers, HR agencies, headhunters, and/or governmental agencies for certain roles. The requestor 112 can use the client 114 to access employee performance reports for potential hires and/or for other evaluative purposes from the host 154. The requestor 112 can rely on host 154 to gain insights into an individual's work history, skills, and/or an overall suitability for a role, which can be provided as part of or as an employees performance report. The host 154 can be configured to allow the requestor 112 to search for employee performance reports, request access to these reports (e.g., in some instances requiring a monetary cost), and/or use information form the reports and/or employee performance scores to make informed decisions regarding hiring or other professional engagements.

In some examples, the host 154 includes an application program interface (API) gateway 116, which can function as an access point to back-end services and/or modules of the host 154 for the users. For example, the API gateway 116 can be configured as an intermediary to allow different components of the host 154, including user interfaces (the client 114), a blockchain network 118, and external services, as disclosed herein, to communicate with each other. A blockchain network refers to a decentralized network of nodes that collectively maintain and update a blockchain. Each node of the blockchain network 118 can be a computer or a computing device. In some examples, the blockchain network 118 is a peer-to-peer (P2P) network that includes nodes managed by different employer organizations, such as the employer 108. A blockchain is a specific type of data structure that consists of a chain of blocks, each containing a list of transactions or records. These blocks can be linked to each other cryptographically, with each block containing a hash of the previous block, thus forming a chain. This structure can be used to ensure an integrity and immutability of data: once a block is added to the chain, it is practically impossible to alter the block without altering all subsequent blocks, which requires consensus from a network majority. Each node of the blockchain network 118 can maintain a ledger. A ledger, in the context of blockchain, is a digital record of transactions. The ledger can be distributed, meaning that the ledger is replicated across the nodes in the blockchain network 118, ensuring that every participant (node) has an identical copy. Each participant in the blockchain network 118 can hold a copy of the decentralized ledger, and any changes or additions to the decentralized ledger can be reflected across all copies based on a consensus mechanism among participants validating changes or additions to the decentralized ledger. The ledger can record details of each transaction made on the blockchain. Thus, the ledger can be a record of transactions that the blockchain maintains. According to the examples herein, the host 154 can leverage blockchain technology to ensure transparency, security, and immutability for management of employee records, such as the employee record 122. For example, once a transaction (e.g., creating, updating, and/or deleting of the employee record 122) is validated and added to the blockchain, the transaction cannot be altered or deleted, ensuring the integrity of the employee record 122 within the system 100.

For example, the API gateway 116 can be configured to coordinate (or facilitate) data interaction, such as between the client 114 and the blockchain network 118 and thus control data flow and system integration. The API gateway 116 can abstract a complexity of the blockchain network 118 from a client perspective. Thus, the client 114 can interact with a simplified interface provided by the API gateway 116, which takes care of forming and sending requests to the blockchain network 118.

In some examples, the API gateway 116 can be configured to enforce security policies, such as authentication and authorization, to control access to the blockchain network 118. The API gateway 116 can be configured to ensure that only valid and authorized requests (e.g., from the employer 108, the employee 110, and/or the requestor 112) are processed by the blockchain network 118, thereby protecting the blockchain network 118 from malicious activities and ensuring that data flow to and/or from the blockchain network 118 is managed securely. In some examples, the API gateway 116 can distribute incoming requests (e.g., from the client 114) across multiple nodes in the blockchain network 118, and thus prevent any single node from becoming a bottleneck. The API gateway 116 can implement load balancing, which can be used in handling high volumes of requests efficiently, ensuring that the data flow remains smooth even under heavy load. In some examples, the API gateway 116 can be configured to transform data (e.g., provided by one or more application, devices, and/or systems, as disclosed herein) for the blockchain network 118 into a format that is compatible with the blockchain network 118 and validate the transformed data before submission to the blockchain network 118. Thus, the API gateway 116 can ensure that data sent to the blockchain network 118 is correct and in an expected format, which reduces errors and mismatches.

In some examples, to prevent overloading of the blockchain network 118, the API gateway 116 can implement rate limiting and throttling routines (or protocols). The API gateway 116 can be configured to ensure that a request rate stays within capabilities of the blockchain network 118, and thus maintain smooth operation and prevent blockchain downtime due to excessive load. In some examples, the API gateway 116 can be configured to cache responses from the blockchain network 118 for frequently requested data, which can reduce a number of requests that need to be processed by the blockchain network 118, speeding up response times for the client 114 and reduce the load on the blockchain network 118. In even further examples, the API gateway 116 can be configured to allow for modularity and flexibility and thus allows for a development of modular components that can be updated or replaced independently without affecting the system 100 (or the host 154). The API gateway 116 allows for scaling and maintainability of the host 154 and seamless integration of various components (e.g., as disclosed herein), while ensuring that a user experience is fluid and backend processes are efficiently executed.

In some examples, the blockchain network 118 is used to store a smart contract 120, as shown in FIG. 1. The smart contract 120 can be used to automate system processes, reduce manual intervention, and enhance consistency and reliability in transactions and/or the employee records. Furthermore, the smart contract 120 can improve the trustworthiness of the system 100 by providing transparent and tamper-proof mechanisms for interactions with the employee records. The smart contract 120 can define rules and/or conditions governing its execution and consists of code. This code (smart contract code) can include one or more functions that can be executed on the blockchain network 118 when specific conditions are met, along with contract state variables. The smart contract 120 can manage how the employee record 122 is created, accessed, modified, and/or updated. The smart contract code can be written in a high-level programming language (e.g., Solidity) and compiled into bytecode. The compiled smart contract bytecode can be deployed on the blockchain network 118 using a deployment transaction. The deployment transaction can be provided by the API gateway 116. The deployment transaction can be signed with a developer's private key and broadcast to the blockchain network 118. The nodes of the blockchain network 118 validate the transaction, and upon successful validation, the smart contract 120 is added to the blockchain. The smart contract 120 becomes live and is assigned a unique address on the blockchain, allowing the smart contract 120 to be interacted with or called by other transactions, such as disclosed herein.

By way of further example, the smart contract 120 can be a self-executing contract with terms of an agreement written into lines of code. The smart contract 120 can provide automated transaction transaction management. For example, the smart contract 120 can be used to automatically handle transactions, such as creating a employee record 122 for the employee 110, recording employee data updates (e.g., updates, modification and/or changes to the employee record 122), processing access requests (e.g., to the employee record 122), and/or managing permissions (e.g., controlling who has rights to access the employee record 122 for the employee 110, one or more reports for the employee 110 and/or the employee performance score for the employee).

In some examples, the employee record 122 for the employee 110 can be stored in a database 124. In some examples, the database 124 includes a distributed storage database that can be implemented based on a distributed file system designed for P2P interaction. The distributed storage database can be used for storing the employee record 122. In some examples, the database 124 includes a NoSQL database for storing other data supporting or handling data types and/or structures associated with employee performance data (or the employee record 122). The distributed file system can utilize an InterPlanetary File System (IPFS) protocol. The IPFS protocol enables a creation of a resilient, global, decentralized network by using content-addressing to uniquely identify and access files (or data, such as records) across a multitude of nodes worldwide. This approach ensures redundancy, high availability, and data integrity by leveraging cryptographic hashing for each piece of data, making an IPFS system robust against data loss and censorship. Each piece of data on the IPFS system can be accessed using a content identifier (CID). When a node looks for data, the IPFS system uses a distributed hash table (DHT) to find which nodes hold the data (the employee record 122) corresponding to that hash. The employers can host and access content in this decentralized manner, ensuring that employee records, among other data, are stored securely and efficiently across a distributed network of nodes. A node in the IPFS network can be a computer or a (computing) device that participates in the IPFS network by running IPFS software. In some examples, the computer or the device is a same or similar device on which the client 114 is being executed. Thus, in some examples, the one or more nodes of the IPFS network can be managed (or under control) of an employer, such as the employer 108. For example, if the employer 108 would like to make employee performance data for the employee 110 available to other employers or requestors, one or more computing platforms (or devices) of the employer 108 can be added as a node to the IPFS system.

In an IPFS network (also referred to as the IPFS system), each participating node contributes to the IPFS system by allocating a portion of its storage capacity to form part of the distributed storage database. This collective network of nodes enables the IPFS system to operate in a decentralized manner, where data is stored and accessed across multiple nodes rather than relying on a central server. By doing so, IPFS enhances data availability and redundancy, as copies of the data are distributed across various nodes globally. This approach ensures that even if some nodes go offline, the data can still be retrieved from other nodes within the network. Moreover, the IPFS system employs a content-addressing scheme where data is identified by its content rather than its location, enabling efficient data retrieval and integrity verification through cryptographic hashes. Instead of referring to data by its location (such as a URL on the internet), IPFS addresses data based on its content hash. When a user requests a file (or record, such as the employee record 122), the IFPS network locates the nodes storing the content via its hash and retrieves the content directly from the nearest node, enhancing efficiency and speed while reducing reliance on any single point of failure.

The employee record 122 can be referred to as a digital representation of professional information for the employee 110. The employee record 122 can be composed of documents, database entries, or other types of digital records. To add the employee record 122 for the employee 110 to the IPFS network the host 154 can be used. For example, the host 154 can be configured with IPFS network functionality (e.g., for adding the employee record 122 to the IPFS network). Once the employee record 122 is desired to be added, the host 154 (or another IPFS capable client) can process the employee record 122 according to IPFS protocol specifications.

For example, the employee record 122 can be broken down into smaller blocks by the host 154. This chunking makes data more manageable and supports efficient transmission across a network. Each block can be hashed using a cryptographic hash function, such as of a hashing system 126, as shown in FIG. 1. In some examples, the hashing system 126 is used to break down the employee record 122 into the smaller blocks. The hashing results in or generates a unique identifier for each block, ensuring data integrity. A unique content identifier (CID) can be generated based on the hash for each employee record 122 by the host 154. This CID is a hash of a record's content, making the CID unique to the record's content. If the record's content changes, a new CID (cryptographic hash) can be generated. The processed record (now in blocks) is stored on one or more nodes of the employers. When the processed record is requested from the IPFS network, the host 154 can use the CID to request the processed record, which can be referred to as a hashed employee record. In some examples, the CID is stored with the cryptographic hash on the blockchain network 118. The IPFS network can locate the nodes storing the processed record (the blocks defining or forming the processed record) and retrieve the blocks, potentially from multiple nodes simultaneously, to reconstruct an original file (the employee record 122).

Accordingly, the IPFS network can be used as an external decentralized storage (EDS) for storing employee records for employees in a secure manner. Each piece of data stored on the IPFS network (the decentralized database) can be identified by a unique hash, derived from the content itself. This means the content cannot be altered without changing its address, providing an inherent layer of security. Additionally, the data can be encrypted before being added to the IPFS network, ensuring that sensitive employee information remains confidential. Furthermore, the decentralized nature of the IPFS network eliminates single points of failure, reducing the risk of data breaches associated with centralized data storage solutions. Data is not stored on a central server but across numerous nodes forming the database 124, making unauthorized access significantly more challenging. Furthermore, the IPFS network can handle large volumes of data efficiently because the IPFS network distributes the storage and bandwidth across all participating nodes. As more nodes join the IPFS network, its capacity to store and serve data increases, enabling the host 154 to scale naturally with demand. Furthermore, because the IPFS network uses a content-based addressing system, the IPFS network allows for efficient data retrieval in the host 154. Files or records are broken down into smaller chunks, which can be fetched in parallel from multiple nodes, speeding up the process of accessing large documents or datasets.

By encrypting the employee record 122 can ensure that only parties with a decryption key can access the sensitive information, ensuring employee data privacy on the IPFS network. Additionally, the IPFS network allows for a creation of private networks or use of specific IPFS gateways, enabling organizations to control who can access their data. This selective sharing mechanism further enhances privacy controls of the host 154. Moreover, data stored on the IPFS network remains accessible as long as the data is hosted by at least one node sharing memory for forming the database 124. This ensures that employee records can be made available when needed, without a risk of downtime associated with traditional single-server systems.

The employee record 122 can include data points related to a professional life of the employee 110. The employee record 122 can include work history and career progression for the employee 110. The employee record 122 can include data points that include previous roles, duration of each role, promotions, job responsibilities, and/or wage. The employee record 122 can include skills and competencies of the employee 110. The employee record 122 can include data points that include skill assessments, certifications obtained, and/or training courses completed by the employee 110. The employee record 122 can include attendance and/or punctuality for the employee 110. The employee record 122 can include data points that specify a number of days attended, times of arrival and departure, instances of tardiness and/or early departures. The employee record 122 can include information specifying a professionalism and/or conduct of the employee 110. The employee record 122 can include data points that specify peer reviews, supervisor assessments of professional behaviors, and/or records of disciplinary actions of the employee 110. The employee record 122 can include information characterizing a work performance and/or quality of the employee 110. The employee record 122 can include data points that specify a quality of work output, error rates, customer feedback, and/or achievement of performance for the employee 110. The employee record 122 can include productivity metrics for the employee 110, and thus can include data points such as tasks completion rates, volume of work completed, and/or adherence to deadlines. The employee record 122 can include information characterizing industry-specific metrics for the employee 110. The employee record 122 can include industry-specific metrics that reflect unique job functions, regulatory requirements and/or market dynamics for the employee 110.

For example, when the employee record 122 is created (e.g., first created), the host 154 uses the hashing system 126 for encrypting the employee record 122 prior to storing on the database 124. The hashing system 126 computes a cryptographic hash of the employee record 122. This hash acts as a digital fingerprint for the employee record 122 at that specific point in time. For example, when the employer 108 wants to add or create data to IPFS, the data is first hashed locally on the host 154. The hashing system 126 calculates the cryptographic hash based on the employee record 122. In some examples, the hashing system 126 breaks down the employee record 122 into blocks and computes a cryptographic hash for each block. The cryptographic hash for each block can be used to locate each block on the IPFS network (the database 124) so that the employee record 122 can be reconstructed, such as at a later time (e.g., when requested or accessed by the employee 110, or the requestor 112, for example).

For example, a cryptographic hash function of the hashing system 126 takes an input (the employee record 122) and produces a fixed-size string of characters (the hash), which is unique to the contents of the employee record 122. This hash can be used to generate a CID, which represents a unique address for the employee record 122. The employee record 122 can be stored in the database 124, and the CID, derived from the hash of the employee record 122, points to its location within the database 124. This process ensures that each employee record has a unique, immutable identifier that facilitates secure and efficient retrieval. The cryptographic hash can be stored on the blockchain network 118 within a transaction. In some examples, this transaction can include other data, such as an employee ID, which can be associated with the employee record 122 for the employee 110. The host 154 leverages a blockchain's immutability; once the cryptographic hash is recorded in a block and that block is added to the chain on the blockchain network 118, and the block (or cryptographic hash) cannot be altered without consensus from the blockchain network 118. Accordingly, the first time the employee record 122 is created by the host 154, its cryptographic hash is computed and stored on the blockchain on the blockchain network 118, as disclosed herein. This establishes a verifiable record of the record's original state. Once verified by the blockchain network 118, the employee record 122 can be stored in the database 124 (on the IPFS system).

In some examples, the API gateway 116 can receive a request for the employee record 122. The request for employee record 122 can include a read request or an access request. The access (or update) request can include information that is to be included or integrated into the employee record 122. The access request can include information identifying the employer 108 (or the requestor 112), a device identifier (ID) of a device being used by the employer 108 (or the requestor 112), and/or a client ID for the client 114, which can be used to provide the access request. For example, the information can include pay raise information.

The API gateway 116 can evaluate the request to identify a type of request. In response to the API gateway 116 determining that the request is an update request, the API gateway 116 can pass the request to the hashing system 126. The hashing system 126 (or in some instances the API gateway 116) sends a transaction to the smart contract 120 on the blockchain network 118 identifying the employer 108 (or the requestor 112), the device ID of the device being used by the employer 108 (or the requestor 112), and/or the client ID for the client 114. A transaction is a record or piece of data that represents an execution of a specific action or set of actions on the blockchain network 118. Transactions typically involve a sender (the entity initiating the transaction) and a receiver (which could be another user, a smart contract, or the same user in cases of self-executing actions). Transactions can carry a data payload, which includes instructions for smart contracts (e.g., function calls with parameters) or any other data intended to be recorded on the blockchain. In some examples, the transaction is a smart contract transaction. These are transactions that interact with the smart contract 120, executing predefined functions within the contract's code. These can include creating the smart contract 120, deploying the smart contract 120 to the blockchain, and calling a function to perform actions (e.g., updating the employee record 122).

The hashing system 126 can issue or provide the transaction when an external actor (e.g., the employer 108 using the client 114) wants to interact with the smart contract 120 (e.g., to update and/or view the employee record 122). The transaction includes data for the smart contract 120 to execute the requested action. This might be identifiers like the employer's ID (or requestor's ID), the device ID of the device being used, or a client ID. These identifiers can serve as parameters for smart contract functions, enabling personalized and secure interactions. Sending the transaction effectively requests the smart contract 120 to execute one of its functions. This could involve reading from or writing to the blockchain, depending on the nature of the function being called. Before the smart contract executes the requested function, the transaction must be validated by the blockchain network 118. Once validated and included in a block, the transaction is confirmed, and the smart contract executes the requested function. The execution of the smart contract function may change the contract's state, update records, or trigger other transactions.

In some examples, upon receiving the request, the smart contract 120 executes its logic to verify if the employer 108 or the requestor 112 is authorized to make such requests (e.g., view/read and/or update requests) based on the transaction from the API gateway 116 or the hashing system 126. If the smart contract 120 confirms that the employer 108 or the requestor 112 is authorized to make such requests, the smart contract 120 communicate a validation reply indicating that the employer 108 or the requestor 112 is authorized to make such requests with the cryptographic hash and the CID for the employee record 122. The validation reply confirms whether the employer 108 or the requestor 112 is allowed to view/read and/or update the employee record 122 for the employee 110.

Once the request is validated, the API gateway 116 or the hashing system 126 can retrieve the employee record 122 from the database 124 using the CID, and decrypt the employee record 122 using the cryptographic hash provided from the blockchain network 118. If the request is a view or read request from the requestor 112, the decrypted employee record can be provided to the client 114 for the requestor 112. If the request is an update request, the employee record 122 can be updated based on the information in the request by the API gateway 116 or the hashing system 126, or the information can be retrieved from the client 114 for the employer 108 and then updated by the API gateway 116 or the hashing system 126.

After updating, a new cryptographic hash of the updated employee record is computed by the hashing system 126 according to one or more examples as disclosed herein. The updated employee record can be uploaded to the database and a CID can be provided to the hashing system 126. The hashing system 126 or the API gateway can store/record the new cryptographic hash and the CID on the blockchain network 118 in a same or similar manner as disclosed herein. A transaction can be generated by the hashing system 126 or the API gateway 116 can be provided to the smart contract 120 with the new cryptographic hash and the CID. The smart contract 120, now with the new cryptographic hash and the CID, records the update on the blockchain. This recording includes updating any references to the data record (such as the CID), and in some instances and any other relevant metadata (e.g., timestamp, previous version's hash for historical linkage). The transaction, including the update made by the smart contract 120, is confirmed by the blockchain network 118 and becomes part of an immutable ledger.

In some examples, the host 154 includes a hash validator 128. The hash validator 128 can be configured to ensure an integrity and authenticity of the cryptographic hash stored on the blockchain network 118. For example, the hash validator 128 can be configured to (e.g., periodically) to compare the stored cryptographic hash on the blockchain against a current cryptographic hash of the employee record 122. The current cryptographic hash of the employee record 122 can be provided by the hashing system 126. A cryptographic hash discrepancy between the stored cryptographic hash on the blockchain network 118 and the current cryptographic hash can indicate a potential tampering or corruption of the cryptographic hash on the blockchain. In some examples, the hash validator 128 can output an alert in response to detecting the cryptographic hash discrepancy. The alert can be provided to a device for a system administrator and/or used by relevant authorities for immediate investigation and action. The hash validator 128 is used to maintain a trustworthiness of the blockchain (e.g., the blockchain ledgers). The hash validator 128 ensures that the cryptographic hash, once written to the blockchain, remains unchanged and unaltered.

In some examples, the host 154 includes a scoring algorithm 130. The scoring algorithm 130 can include an artificial intelligence (AI)-driven component that can be used for evaluating and scoring employee performance based on metrics. The scoring algorithm 130 can be configured to analyze employee data, including performance metrics, professional achievements, peer reviews, and/or other parameters/variables based on the employee record 122. The scoring algorithm 130 can be adapted based on different industry standards and job roles, and thus provide a tailored employee performance score for each employee, such as the employee 110. The scoring algorithm 130 can provide an objective and comprehensive assessment of employee performance. The scoring algorithm 130 transforms qualitative and quantitative data into a standardized score, and thus allows for fair and more informed decision-making processes for employers, such as the employer 108 and enhances employee transparency.

In some examples, the host 154 includes a score job scheduler 142 that can be configured to cause the scoring algorithm 130 to periodically compute an employee performance score for the employee 110. The employee performance score for the employee 110 can be stored in the employee record 122 for the employee 110, in other examples on the blockchain network 118. In some examples, if stored on the blockchain network 118, the employee performance score can be linked or associated with an employee ID. For example, the score job scheduler 142 can be implemented as a cron job. The score job scheduler 142 can cause the scoring algorithm 130 to be executed to calculate the employee performance score. In some examples, the employee performance score can be calculated on a monthly basis. Thus, the score job scheduler 142 can automatically trigger an employee performance score computation process at regular monthly intervals, which processes the latest available data for each employee, such as the employee 110. In some examples, upon computing the employee performance score, the score job scheduler 142 or the scoring algorithm 130 can update the employee record 122 for the employee 110 with the new employee performance score and thus ensure that performance evaluations are current and reflective of recent activities of the employee 110. By computing the employee performance score periodically (e.g., monthly) can ensure that up-to-date performance evaluations are maintained for the employee 110 in the employee record 122 and thus provide timely insights into achievements of the employee 110 and/or areas for improvement. This regular assessment enables the host 154 to provide dynamic and ongoing workforce management through management of the employee record 122 for the employee 110.

In some examples, the host 154 includes a verification system 132. The verification system 132 can be used by the API gateway 116 (or other components of the host 154) to communicate and/or interact with an external certificate authority (ECA) 134 (e.g., a system a computer, a device, etc.) so that one or more users of the host 154 (or the system 100), such as the employer 108, the employee 110, and the requestor 112 can be verified (e.g., an identity can be verified). The ECA 134 can be used to ensure the security and integrity of digital interactions with the system 100 by issuing digital certificates to verify the identity of users (e.g., the employer 108, the employee 110, and the requestor 112), devices (e.g., used by the employer 108, the employee 110, and the requestor 112), and/or nodes on the blockchain network 118 and/or the IPFS network. The ECA 134 can be configured with an identity management system to facilitate user authentication and control access, ensuring that only authorized personnel can execute transactions on the blockchain implemented on the blockchain network 118. The issuance of digital certificates by the ECA 134 to the verification system 132 after verification of credentials helps prevent impersonation and unauthorized access, thereby maintaining the integrity of the host 154. Through the use of Public Key Infrastructure (PKI), the ECA 134 enables secure, encrypted communication across components, and safeguards sensitive data during transmission. Additionally, the ECA 134 can manage a lifecycle of certificates, including their renewal and revocation, to replace outdated or compromised certificates promptly. This comprehensive approach to certificate management is crucial for maintaining a secure environment for all transactions and interactions within the blockchain network 118.

For example, the API gateway 116 can provide information identifying one or more users (e.g., the employer 108, the employee 110, and the requestor 112), one or more devices (e.g., used by the employer 108, the employee 110, and the requestor 112), and one or more nodes of the blockchain network 118 and/or the IPFS system to the verification system 132. The verification system 132 can communicate with the ECA 134 to confirm whether each user, device is authorized based on the provided information.

In some examples, the host 154 includes a data entry system 136. The data entry system 136 can be configured to communicate with one or more external data sources 138. In some instances, the one or more external data sources 138 can be an application or system. In some examples, the one or more external data sources 138 can be a third-party tool or an employee software system that the host 154 can be integrated into (e.g., using the data entry system 136) to receive or extract relevant data, such as employment data for creating or updating the employee record 122 for the employee 110.

The data entry system 136 can be implement as an API that enables the host 154 to hook into various external applications, for example, an human resources (HR) management system, a time tracking tool, a professional network site from which the employee performance data can be gathered for the employee 110 and stored in the employee record 122. The data entry system 136 can receive or retrieve the employee data and process the employee performance data to transform this data into a format that is compatible with the host 154. Thus, the data entry system 136 can harmonize external employee performance data for use by the host 154. The data entry system 136 can receive the employee performance data and update the employee record 122 in a same or similar manner as disclosed herein. Because the host 154 incorporates or considers employee performance data, such as from one or more external data sources 138 enriches or improves a data quality of an employee profile (the employee record 122) for the employee 110, which results in a more comprehensive evaluation of performance and capabilities of the employee 110 by the host 154. This is because the employee profile for the employee 110 is not only populated with employee data by the employer 108 (e.g., a human) using the client 114, but also from employee performance data stored at one or more external data sources 138. As such, the host 154 can capture a holistic view of an employee's professional journey in the employee record 122 for the employee 110.

In some examples, the host 154 includes a data scheduler 140 is used to periodically request, retrieve, extract or query the one or more external data source 138 for the employee performance data. In some examples, the data scheduler 140 is a task that is programmed to periodically extract data from the one or more external data sources 138 and update employee records. The data scheduler 140 can be configured to provide scheduled employee performance data extractions and a systematic approach for ingesting or pulling employee performance data from the one or more external data sources 138 into the host 154. Following data extraction, the data scheduler 140 or the data entry system 136 can update an existing employee record with any new employee performance data, ensuring that the data for the employee 110 remains fresh and relevant in the employee record 122. By periodically extracting employee performance data from the one or more external data sources 138 enables the host 154 to continuously evolve with the latest data inputs, and capture real-time changes in employee performance and activities. This regular updating of the employee record 122 enables the host 154 to provide dynamic and responsive workforce management.

In some examples, the host 154 includes a reporting system 144. The reporting system 144 can be configured to provide one or more reports, including an employer report for the employer 108, an employee report for the employee 110, and a requestor report for the requestor 112. The one or more reports can be generated based on the employee record 122 and the smart contract 120, which can specify which and type of information that each of the employer 108, the employee 110, and the requestor 112 is permitted to receive or view. The reporting system 144 can be configured to provide an employee performance report, such as to the requestor 112.

For example, the reporting system 144 can be used to enable the employee 110 to access current employee performance data and/or employee performance score from the employee record 122. The employee 110 can submit a request for employee performance data (or report) and/or the employee performance score using the client 114 to the API gateway 116. In some examples, the request is validated using the blockchain network 118 according to one or more examples, as disclosed herein. The reporting system 144 can process the request for the employee performance data and/or the employee performance score so that the employee 110 can track information, employment/career progress, and gain insights into specific areas of strength and opportunities for improvement. The employee 110 can be provided at the client 114 by the reporting system 144 with the employee performance data and/or the employee performance score, which enables the employee 110 to see verified job history, promotions, skills, major project contributions as part of the employee record 122 for the employee 110.

In some examples, the reporting system 144 can be used to enable the employer 108 to access the employee record 122. The client 114 can be used to enable the employer 108 to access employee performance data and/or the employee performance score from the employee record 122 for the employee 110. The employer 108 can access the employee record 122 for the employee 110 to track information, employment progress, and gain insights into specific areas of strength and opportunities for improvement. The employer 108 can see the employee's verified job history, promotions, skills, major project contributions as part of their data record on the host 154.

In some examples, the host 154 includes an appeal system 146. The appeal system 146 can be used by the employee 110 to address potential inaccuracies and/or biases in data stored in the employee record 122 for the employee 110. For example, the employee 110 can use the client 114 to submit an appeal request identifying the potential inaccuracies and/or biases in the employee record 122. The API gateway 116 can process the appeal request to determine that the appeal request should be provided to the appeal system 146. In some examples, the appeal system 146 can include machine-learning and/or rules for processing the appeal request and updating the employee record 122 in response to determining that the employee record 122 includes inaccuracies and/or biases for the employee 110. In some examples, the appeal system 146 can issue an appeal review request, which can be provided to the API gateway 116 and transmitted to the client 114. The employer 108 can review the appeal review request and update the employee record 122 in a same or similar manner as disclosed herein if the employer 108 determines that the employee record 122 includes inaccuracies and/or biases for the employee 110. In some examples, the employee record 122 is updated by the appeal system 146 in a same or similar manner as disclosed herein in response to the employer 108 providing an update request, which can indicate that the update is a result from an employee appeal.

The employee 110 can use the client 114 to initiate correction requests to the appeal system 146 through a dedicated interface on the client 114 to ensure that employee performance data in the employee record 122 accurately reflects the achievements of the employee 110. The employee 110 can use the client 114 to attach evidence or explanations to support the appeal request (in some instances known as a correction request), which can be provided to the appeal system 146, to facilitate a transparent and fair review process. In some examples, the employee 110 can use the client 114 to submit the appeal request to the appeal system 146 to remove the employer 108 as a current employer. The employee 110 can use the client 114 to deny and approve requests to access the employee record 122, which can be referred to as access requests. For example, the employee 110 can receive via the client 114 an indication that the requestor 112 wants to access the employee record 122. The employee 110 can use the client 114 to approve or deny the access requested. Thus, the employee 110 can use the client 114 to control over which employer or requestor has access to the employee record 122 or access to one or more data points of the employee record 122. Because the employee 110 can control who has access to the employee record 122 can ensure the employee's privacy and require consent in a data sharing process. In some examples, the employee 110 can approve or deny the access request using the client 114 for an employee performance report and/or employee performance score being requested by the requestor 112. Thus, the employee 110 can safeguard their personal and employee performance data via the client 114, sharing this data only with parties that the employee 110 trusts and/or deems necessary for professional opportunities. The employee 110 can use the client 114 to see a list of approved and denied access requests so that employee 110 can track who has been granted access to the employee record 122 or employee performance report and/or employee performance score over time, which enhances transparency and personal data management.

In some examples, the host 154 includes a payment system 148. The payment system 148 can be used by the requestor 112 to pay for the employee performance report and/or employee performance score for the employee 110. For example, the requestor 112 can submit via the client 114 a payment request with payment information (e.g., credit card information or bank information, or other types of payment information) to the API gateway 116. The API gateway 116 can process the payment request to determine that the payment request should be provided to the payment system 148. The payment system 148 can communicate with a payment processor 150 to complete a payment for the employee performance report and/or employee performance score for the employee 110. The payment processor 150 can provide a confirmation to the payment system 148 that the payment for the employee performance report and/or employee performance score for the employee 110 has been completed. The payment processor 150 can provide the confirmation to the client 114 of the requestor 112. In some examples, the payment processor 150 provides a receipt to the client 114 or the host 154. The API gateway 116 can notify the reporting system 144 in response to receiving the confirmation from the payment processor 150 or the payment system 148. The reporting system 144 can provide the employee performance report via the client 114 to the requestor 112. In some examples, the API gateway 116 passes the confirmation to the reporting system 144. The reporting system 144 can provide the employee performance report to the client 114 of the requestor 112 in response to the confirmation. In some examples, the API gateway 116 or the hashing system 126 can provide the employee performance score to the client 114 in response to the confirmation.

Accordingly, the host 154 enables employers, employees, and requestors to exchange data in a safe and secure manner. The host 154 empowers both employers and employees, and offers employers a reliable tool for evaluation of employees The host 154 can provide a cross-industry standardization of score. The scoring of the host 154, is akin to a Fair Isaac Corporation (FICO) score, and provides a standardized metric for employee evaluation across different industries. The host 154 can use a dynamic AI-driven scoring algorithm that evaluates an employee's performance across metrics and offers a nuanced and evolving view of an employee's professional value. Through blockchain and IPFS integration, data integrity can be ensured through a secure and reliable process, which provides a significant advantage over conventional data storage methodologies. Furthermore, because the host 154 employs an appeal mechanism, employee data accuracy can be improved by addressing potential inaccuracies and biases in data entry, which enhances a fairness and credibility of the host 154. Moreover, the host 154 allows for comprehensive data aggregation, which unlike traditional HR systems, allows for integration (e.g., use) of employee performance data from internal records, public sources, and/or employer inputs. Accordingly, the host 154 provides a holistic view of an employee's career. Incorporating data from one or more external data sources provides another layer of depth to employee profiles, setting the system 100 apart from traditional employee evaluation tools.

In some examples, the host 154 can include a user manager 152. The user manager 152 can manage an account for each of the employer 108, the employee 110 and the requestor 112. For example, the employee 110 can log into an employee account so that the employee 110 can securely access a profile for the employee 110 and associated data. The employee 110 can register with the host 154 and be provided with an account, which the employee 110 can use to access a functionality of the host 154 based on a respective role. For example, the employee 110 can be provided or can use the host 114 to create a unique username and password and this is login information can be used to access the functionality of the host 154. The host 154 enables the employee 110 to recover a forgotten password so the employee 110 can regain access to the respective account. The client 114 can be used to enable the employee 110 to view a corresponding profile for the employee 110 (e.g., personal and contact information) so that the employee 110 can verify an accuracy of employee account information. The employee 110 can update the employee account information so that this information remains current and accurate.

In some examples, the employer 108 can register (sign up) and create an employer account for accessing functionality of the host 154. The employer 108 can register for an account so that the employer 108 can access functionalities of the host 154 for the employer 108. The employer 108 can log in to the employer account so that the employer 108 can securely access an employer profile and associated data. The employer 108 can recover a forgotten password so that the employer 108 can regain access to the employer account in case the employer 108 forgets login credentials. The employer 108 can use the client 114 to interact with the host 154 to enroll the employer 108 and thus enable the host 154 to track and manage employee data for the employee 110 through employee records. The employer 108 can input employee details such as name, social security number, ID, start date, position, and/or wage. The user manager 152 can provide the client 114 with a digital streamlined enrollment form to add new employees to the host 154 for efficient onboarding. In some examples, the client 114 can be configured with a bulk-upload option so that the employer 108 can enroll multiple employees simultaneously to save time and effort.

The employer 108 can use the client 114 to interact with the host 154 to manage employees. For example, the client 114 can be used to enable the employer 108 to view all enrolled employees so that the employer 108 can easily manage and review a workforce in one place. The client 114 can be used to allow the employer 108 to see one or more employee performance reports (or the employee record 122 or a subset of the employee record 122) without employee permission. The client 114 can be used to allow the employer 108 to update employee information so that any changes in employee details, position, and/or wage can be accurately reflected in the employee record 122 according to one or more examples, as disclosed herein. The client 114 can be used to provide the employer 108 with an application interface that enables the employer 108 to enter and update individual performance metrics of the employee record 122 and thus to keep employee records current. The employer 108 can use the client 114 to enter ongoing employee performance data including, but not limited to, attendance, productivity, and/or performance metrics. The employer 108 can receive through the client 114 regular reminders or prompts for updating employee performance data to ensure data remains up-to-date. In some examples, the employer 108 can use the client 114 to integrate the host 154 with the one or more external data sources 138, in some instances, including third party data sources. The data can be extracted for the employee 110 and incorporated into the employee record 122, as disclosed herein. The host 154 can extract external data in some instances via an API automatically on a routine (e.g., weekly, monthly, etc.) according to one or more examples as disclosed herein.

In some examples, the requestor 112 can use the client 114 to communicate with the user manager 152 to register and create a requestor account. The requestor 112 can register for an account so that requestor 112 can access one or more functionalities based on a requestor role. The requestor 112 can log in to the requestor account so that requestor 112 can securely access a requestor profile and associated data. The requestor 112 can recover a forgotten password so that the requestor 112 can regain access to the requestor account in case the requestor 112 forgets login credentials. The requestor 112 can use the client 114 to request one or more different types of employee performance reports. The requestor 112 can request a 1 year report, a 3 year report, or a 5 year report for the employee 110, for example, when deciding whether to hire the employee 110. The client 114 can be used to allow the requestor 112 to access employee performance reports. The requestor 112 can use the client 114 to securely access detailed employee performance reports that have been approved by the employee 110 to inform decisions regarding. The requestor 112 may have to agree to data privacy and compliance terms to protect employee information, which can be provided in the report. As disclosed herein, the requestor 112 can pay according to one or more examples for each report and/or score for each employee. In some instances, the report includes the score. The requestor 112 can receive a receipt at the client 114 from the host 154 after payment. The requestor 112 can use the client 114 to specify set account preferences and payment methods so that requestor 112 can streamline a process of requesting reports.

Figure 2:
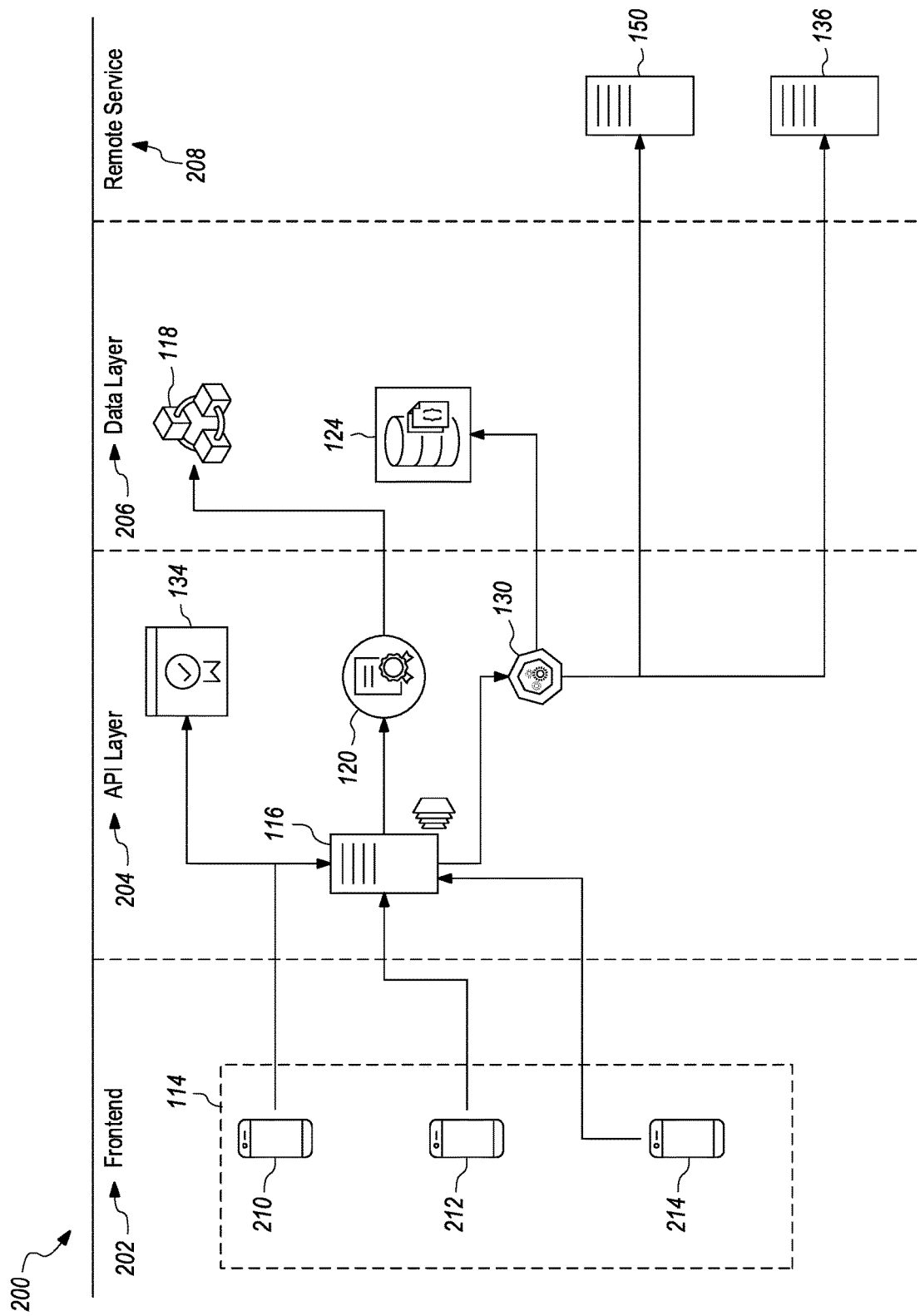
FIG. 2 is an example of a system architecture for the data exchange system.

FIG. 2 is an example of a system architecture 200 for the system 100, as shown in FIG. 1. Reference can be made to one or more examples of FIG. 1 in the example of FIG. 2. The system architecture 200 can be composed of a frontend layer 202, an API layer 204, a data layer 206, and a remote service layer 208. The frontend layer 202 can represent a user interface and user experience components of the system 100, where users can interact with the host 154 via the client 114. The API layer 204 acts as a gateway or intermediary that enables the frontend layer 202 to communicate with one or more backend services, ensuring secure and organized data exchange. The data layer 206 can be responsible for managing the data, including databases, data processing services, and potentially caching solutions, ensuring data is stored, retrieved, and managed efficiently. The data layer 206 can include blockchain storage and distributed data storage. The remote service layer 208 can include various backend services, third-party services, and infrastructure components that can be relied on, which may be hosted on-premises or in the cloud.

For example, at the frontend layer 202, different users can access the system 100. The frontend layer 202 can include an employee application 210, an employer application 212, and a requestor application 214. In some examples, the applications 210-214 can be implemented as a web-based, mobile, or desktop application using technology like ReactJS. Each application 210-214 can provide a user interface with which the user can interact to initiate or cause or more functions at the host 154, for example, as disclosed herein.

The API layer 204 can be based on Node Js and Express.js (e.g., Nod.js Framework). The API layer 204 can be configured to facilitate host-side operations for handling operations and can manage concurrent requests, which is needed for a system with multiple user interactions and data processing tasks, such as the system 100. The API layer 204 enables interaction between the blockchain network 118 and application's front-end or other systems. The API layer 204 can facilitate flow of data between the blockchain network 118 and one or more other components or applications of the data exchange system 100, ensuring that user actions on the frontend are accurately reflected on the blockchain network 118. One or more APIs as disclosed herein can reside at the API layer 204. The one or more APIs can be based on a Representational State Transfer (RESTful) architecture. REST is an architectural style for designing networked applications. RESTful APIs are based on HTTP and use HTTP requests to access and use data. Operations used in RESTful APIs can include GET (to retrieve resources), POST (to create resources), PUT (to update resources), DELETE (to delete resources), and sometimes PATCH (to apply partial updates to resources).

The one or more APIs at the API layer 204 can serve as a middleman that allows the client 114 to request data from the host 154, perform actions (like creating or updating data), and receive responses. The one or more APIs at the API layer 204 can facilitate client-host communication or interactions. The one or more APIs at the API layer 204 can be integrated with Node.js in some instances. Thus, the one or more API's at the API layer 204 can be compatible with a Node.js environment, and can be used to leverage Node.js's non-blocking I/O and event-driven architecture. This compatibility is beneficial because Node.js is known for its performance and efficiency in handling concurrent connections, which enables the system 100 (or the host 154) to be scaled. Additionally, maintainability is improved because RESTful APIs are designed to be stateless and self-descriptive. Included at the API layer 204 is data hashing and encryption. Mechanisms that utilize cryptographic hashing (e.g., SHA-256) and encryption techniques can be implemented. The purpose of including data hashing and/or encryption is to secure data before the data is recorded on the blockchain network 118 according to one or more examples, as disclosed herein. Hashing and encrypting the data ensures privacy and security, as only the hash of the sensitive data is stored on the blockchain.

At the API layer 204, an AI algorithm can be used for computing the employee performance score. The scoring algorithm 130 can include the AI algorithm. In some examples, the scoring algorithm 130 is implemented according to an API framework. The AI algorithm can be based on a machine learning framework, such as TensorFlow or PyTorch. TensorFlow and PyTorch can be used as open-source machine learning libraries for the scoring algorithm 130.

At the data layer 206, IPFS is used to store and share data in a distributed file system (e.g., an IPFS system), such as the employee record 122. IPFS uses content-addressing to uniquely identify each file in a global namespace, connecting all computing devices with the same system of files. It is designed to make the web faster, safer, and more open. The IPFS is used for distributing high volumes of data without centralized control, such as datasets, including the employee record 122. In some examples, at the data layer 206 a NoSQL database is used, such as MongoDB. MongoDB is a NoSQL database that stores data in flexible, JSON-like documents, meaning data structure can change over time. This model makes it easy to store and combine data of any structure, which can be particularly useful for managing the varied data types and structures associated with employee performance data. MongoDB is well-suited for applications requiring rapid development, scalability, and the ability to handle a variety of data types and structures. The NoSQL database can be used for storing user profiles of users that use the system 100. Using both IPFS and the NoSQL database together allows for leveraging IPFS for decentralized storage solutions of employee performance data in an employee record and the NoSQL database for structured, queryable data storage, like user profiles, non-blockchain transactional data, and other operational data for handling the varied data types and structures associated with employee performance data (or the employee record).

The blockchain network 118 can be based on a blockchain architecture that is designed to provide a secure, transparent, and tamper-proof system for recording and auditing all interactions with employee performance data (the employee record 122). The blockchain network 118 can leverage smart contracts, such as the smart contract 120, for automated transaction execution, cryptographic techniques for data security, and a distributed ledger for decentralized storage, all orchestrated through a permissioned blockchain network to ensure privacy and control. The blockchain architecture can be based on a permissioned blockchain network. A permissioned blockchain is a type of blockchain network where access to the network is restricted and controlled. Participants need explicit authorization to join the network, read from the blockchain, submit transactions, or participate in the consensus process. This is in contrast to permissionless blockchains, like Bitcoin or the public Ethereum network, where anyone can join and participate without prior approval. Example permissioned blockchain networks can include Hyperledger Fabric or Ethereum's private network. This type of network ensures secure and authorized access to the blockchain, suitable for sensitive employee data. This blockchain network can maintain privacy and control over the data while leveraging blockchain's benefits of immutability and transparency.

The blockchain network 118 can consist of multiple nodes that can be distributed across different locations. These nodes can be hosted by various stakeholders, such as different companies or organizations (e.g., the employers) participating in the network. This distributed nature ensures that no single entity has complete control over the entire network, promoting a decentralized approach. Each node in the network has a role: it stores a complete copy of the ledger, which is a record of all transactions or data exchanges that have occurred. This means that every piece of data is replicated across multiple nodes, ensuring that the information is consistently available across the network. The distributed setup of nodes is fundamental to the network's resilience and security. By having multiple copies of the ledger stored across various nodes, the system significantly reduces the risk of data loss. For example, if one node goes offline or is compromised, the data can still be accessed from other nodes. Additionally, this architecture makes it extremely difficult for any malicious actor to alter transaction records without being detected, as such actors would need to tamper with the majority of the nodes simultaneously, which is highly impractical. Therefore, distributed nodes play a vital role in enhancing the system's robustness against data loss, unauthorized modifications, and tampering, contributing to the overall trustworthiness and reliability of the blockchain network 118.

The smart contract 120, which is a self-executing contract with the terms of an agreement directly written into code, can be developed using specific programming languages and thus tailored for the blockchain network 118. For Ethereum-based applications, Solidity can be used, which allows for the creation of complex contractual instructions that operate on the Ethereum Virtual Machine (EVM). For Hyperledger-based projects, chaincode can be used, which is Hyperledger's equivalent to smart contracts, allowing for business logic to be implemented on the Hyperledger Fabric platform. The smart contract 120 is used to automate the execution and recording of transactions on the blockchain network 118. This automation is triggered by various actions, such as when an employee record (or employee performance data) is created, read, updated, or deleted in the host 154. By doing so, the smart contract 120 eliminates the need for an intermediary, ensuring that transactions are executed exactly as per the code's instructions once predefined conditions are met. The smart contract 120 is used to ensure transactional integrity and consistency across the blockchain network 118. The smart contract 120 can be used to enforce predefined rules automatically, reducing the likelihood of human error and the need for manual processing. This automation ensures that all parties adhere to the agreed terms without deviation, enhancing the efficiency and reliability of transactions.

The blockchain network 118 can employ a consensus mechanism, such as Proof of Authority (PoA) and Practical Byzantine Fault Tolerance (PBFT) for verifying transactions. PoA relies on a set of approved validators to verify transactions, making it efficient and less energy-intensive than mechanisms like Proof of Work. PBFT, on the other hand, is designed to provide a high level of fault tolerance, ensuring the network continues to operate even if some nodes act maliciously or fail. The consensus mechanism is used to validate transactions and achieve agreement among all participating nodes on the current state of the distributed ledger. This process ensures that each copy of the distributed ledger is identical and up to date, maintaining a single truth across the blockchain network 118. The consensus mechanism is used for maintaining the security and integrity of the blockchain on the blockchain network 118. It prevents double-spending, ensures that all transactions are valid, and maintains a consistent state across the network. Thus, the consensus mechanism provides a robust methodology to validate transactions and achieve consensus for the blockchain network 118.

In some examples, one or more APIs as disclosed herein can interact with an ECA. For example, the verification system 132 can be implemented as an API that can interface with an ECA system or computer. ECAs serve as trusted entities responsible for issuing digital certificates, and can be used in verifying the identities of various participants of the system 100, including employers, employees, requestors, and even the nodes. This verification process is integral to integrating with an identity management system, which is designed for user authentication and controlling access within the network. The main purpose of this setup is to manage permissions and access rights efficiently, ensuring that only authorized individuals have the capability to execute transactions on the blockchain, thereby maintaining a high level of security and integrity. Furthermore, ECAs facilitate secure communication across the system by employing Public Key Infrastructure (PKI), which encrypts communications between client applications, the API layer, and the blockchain network, safeguarding sensitive data during transmission. Additionally, ECAs oversee the management of the digital certificates' lifecycle, including tasks such as renewal and revocation, to ensure that certificates remain up-to-date and secure. This comprehensive approach to certificate management and identity verification is essential for preventing impersonation and unauthorized access, thereby bolstering the overall security framework of the system. Through the validation of digital certificates by client applications before any blockchain interaction, the system 100 ensures that all transactions are conducted by verified and authorized users. Thus, before any operation that requires blockchain interaction or data exchange, the digital certificates of the users can be validated, ensuring that these users are authorized for the requested action.

Remote service access can be incorporated into the system architecture 200. For example, at the remote service layer 208, the payment processor (e.g., the payment system 148) and the data entry system 136 can be used to enhance the system's capabilities and user experience. The payment system 148 facilitates financial transactions, such as handling fees associated with accessing employee reports and/or score by requestors, such as the requestor 112. The payment system 148 can securely process payments made by requestors when accessing employee reports and/or scores, ensuring transactions are completed smoothly and securely. The payment system 148 can connect with banks, credit card companies, and digital wallets to offer multiple payment options to users. The payment system 148 can implement security measures and fraud detection algorithms to protect transaction data and user financial information. The payment system 148 can be integrated into a requestor's workflow within the client application, providing a seamless payment experience when accessing reports. While the payment processing itself may not occur on the blockchain, transaction records or tokens representing successful payments could be recorded on the blockchain for transparency and auditability. Integrating the payment system 148 helps with automating the financial aspects of the system, providing convenience for users, and ensuring the security of financial transactions.

The data entry system 136 can be used to enrich the employee performance data stored in the system 100 by integrating with external data sources such as professional networking platforms, HR systems, and public records. In some instances, the data entry system 136 can automatically import relevant data to enhance employee profiles, such as additional skills, certifications, or work history not initially provided by the employer. In some examples, the data entry system 136 invokes the data scheduler 140 for importing relevant data. The data entry system 136 can be configured to cross-references employee data with trusted external sources to verify the accuracy and authenticity of the information provided. The data entry system 136 can be configured to connect to third party systems via APIs to pull in data, ensuring that the latest information is always reflected in the system. In some examples, employer portals (or interfaces) can be used to allow employers to link external accounts or data sources for automatic data import and synchronization.

In view of the foregoing structural and functional features described above, an example methods will be better appreciated with reference to one or more accompanying figures. While, for purposes of simplicity of explanation, the example methods as shown in FIGS. 3-8 and 10-11 and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

Figure 3:
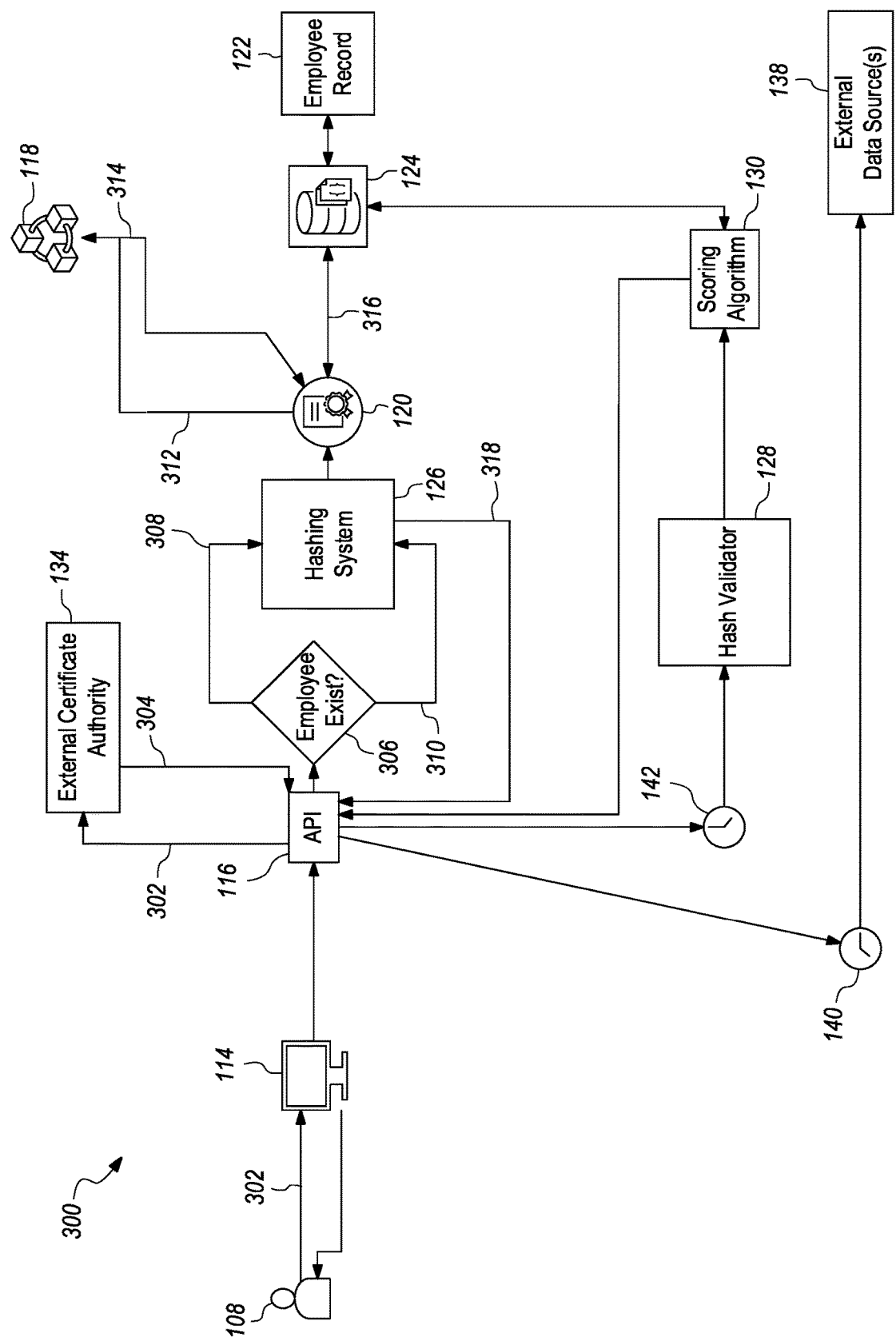
FIG. 3 is an example of a method for enrolling employees and updating an employee record.

FIG. 3 is an example of a method 300 for enrolling employees (e.g., the employee 110, as shown in FIG. 1) in the system 100, as shown in FIG. 1 and updating an employee record (e.g., the employee record 122, as shown in FIG. 1) that is being managed by the system 100. Thus, reference can be made to the example of FIGS. 1-2 in the example of FIG. 3. The method can begin at 302 with employee enrollment. Employers can enroll employees into the system 100 to manage and track employee performance data for the enrolled employees. In some examples, employers can also use the system 100 to routinely enter the employee performance data in specified categories (e.g., such as attendance, productivity, and/or professionalism) so that the employer 108 can maintain updated and accurate records (employee records) of employee performance, leading to more informed management decisions.

To use the system 100, the user (e.g., the employer 108) enters credentials (e.g., username and password, for example) at the client 114 of the system 100. At 304, the API gateway 116 communicates with the ECA 134 to verify the identity of the user to determine whether the user has necessary permissions to make changes to an employee record or create the employee record. At 306, the identity of the user is verified and the ECA 134 communicates a verification status indicating that the user is verified. Verification of the user for using the system 100 enables the system 100 to maintain data security and integrity. Upon successful verification, the system 100 proceeds with the operation. The client 114 can provide feedback to the user regarding the verification status.

In some examples, the method includes the API gateway 116 receiving a request from the user (the employer 108) via the client 114. The request can be a request to enroll an employee in the system 100, or a request to update the employee record 122 for the employee. At 308, the API gateway 116 determines whether the employee record 122 exists for the employee. The API gateway 116 checks the database 124 for the employee record 122 for the employee. For example, the API gateway 116 can query the database 124 using a unique employee ID. Each employee that is enrolled into the system 100 is assigned a unique employee ID. Each employee record is associated (e.g., logically linked) in the database 124 with a unique employee ID. If the employee record 122 for the employee 110 does not exist in the database 124, at 310, the API gateway 116 (or the host 154) can create the employee record for the employee. The user can use the client 114 to provide the employee performance data that forms at least part of the employee record 122 for the employee 110. Alternatively, if the employee record 122 for the employee exists, at 312, the API gateway 116 (or the host 154) can update the employee record with new employee performance data. Before any create, update, or delete operation (e.g., data operation) is performed, for example, with respect to the employee record 122, the employee record 122 (or the employee performance data) can be hashed by the hashing system 126 of the host 154 and a cryptographic hash is generated. The cryptographic hash can be a fixed-size string (or digest) that uniquely represents the employee record 122 (or the hashed employee performance data). The hashing of the employee record 122 ensures that sensitive information is not directly stored or transmitted, preserving privacy and enhancing data integrity. Thus, before the storage of the employee record 122 in on database 124, the employee record 122 can be hashed. Similarly, before any changes are made to the employee record 122, such as a deletion or updating operation, the employee record 122 can be hashed.

At 314, the API gateway 116 (or the host 154) can communicate the cryptographic hash for the hashed employee record and the unique employee ID for the employee to the blockchain network 118 for recording based on the smart contract 120. This action creates a transaction that, once validated by the blockchain network 118, is recorded in the blockchain ledger. Each data operation (e.g.,  create, update, and/or delete) triggers a corresponding transaction on the blockchain. The API gateway 116 or host 154 creates a transaction that includes the cryptographic hash of the employee record 122 and the unique employee ID. The created transaction is then submitted to the blockchain network 118. The submission acts as a request for the blockchain network 118 to validate and, if accepted, incorporate this transaction into the blockchain ledger based on the smart contract 120.

Once the transaction is submitted, it undergoes a validation process by the nodes (participants) in the blockchain network 118. Depending on a blockchain's consensus mechanism (such as Proof of Work, Proof of Stake, etc.), the transaction must be approved by the blockchain network 118. The blockchain network validates the transaction through its consensus mechanism. This validation process includes checks for data consistency and adherence to the smart contract 120 conditions. This process ensures that only valid and authorized transactions are added to the blockchain. Upon successful validation, the transaction is included in a block. When this block is added to the blockchain, the smart contract code is executed by the nodes participating in the network. After validation and achieving consensus, the transaction is recorded in a new block and added to the blockchain. This new block, containing transaction details, is cryptographically linked to the preceding block in the chain. This sequential linking of blocks forms the blockchain ledger, a continuous and unalterable record of all transactions on the network. This block, containing the transaction details, is cryptographically linked to the preceding block in the chain, ensuring the transaction's immutability and permanence.

Once recorded on the blockchain, the transaction is considered final and immutable. It cannot be altered or deleted without consensus from the network, which is practically infeasible due to the cryptographic and decentralized nature of blockchain technology. When a block containing a transaction that interacts with a smart contract is added to the blockchain, the contract's code is executed by the network nodes. This execution can alter the state stored on the blockchain in accordance with the contract's logic but does so in a way that is transparent, traceable, and immutable. Accordingly, once a transaction (such as creating, updating, or deleting the employee record 122) is validated and recorded on the blockchain, it signifies that the operation has been securely and immutably logged. This transaction typically includes the hash of the data (the employee performance data or the employee record 122) involved and references to specific identifiers like an employee's unique ID.

In some examples, after the transaction is successfully recorded on the blockchain, a notification mechanism or an event listener (integrated into the system's architecture) detects this successful transaction. This could be implemented through blockchain event listening features, where certain events (like transaction completion) trigger actions in external systems, such as the system 100. For example, the system 100 includes a component that monitors the blockchain for specific events indicating that a transaction has been successfully completed. This can be achieved through event listeners or webhooks configured to detect when a transaction is validated and added to the blockchain. At 316, the blockchain network 118 responds to the host 154 (or the API gateway 116) that the transaction has been successfully recorded on the blockchain, or the listener detects the successful completion of the transaction on the blockchain.

In some examples, the blockchain network 118 responds to the host 154 according to the smart contract 120.

Upon successful verification of the blockchain transaction, the host 154 or the API gateway 116 triggers a process to update the employee record 122 in the database 124. At 318, this process can involve translating the blockchain event into a specific action in the database 124 (e.g., inserting a new record, updating an existing record, or deleting a record). The hashed employee record is submitted or provided to the database 124 for storage. At 320, the employee record 122 can be returned or provided to the API gateway 116 and transmitted to the client 114 for the user. In some examples, a confirmation of successful operation is also provided to the client 114.

In some examples, the steps of block chain transaction validation and recording, updating the employee record and returning the new record to the employee as disclosed herein can be treated as a single transactional unit. If any step fails, an entire operation can be rolled back to maintain data consistency. In some examples, the host 154 can be configured for error handling and notifications. The host 154 can provide clear error messages and notifications throughout a process, especially in cases of verification failure, blockchain transaction failure, or database update issues. The host 154 can be configured to maintain detailed logs of all operations, including user actions, system responses, and blockchain transactions, to support auditing and troubleshooting.

Figure 4:
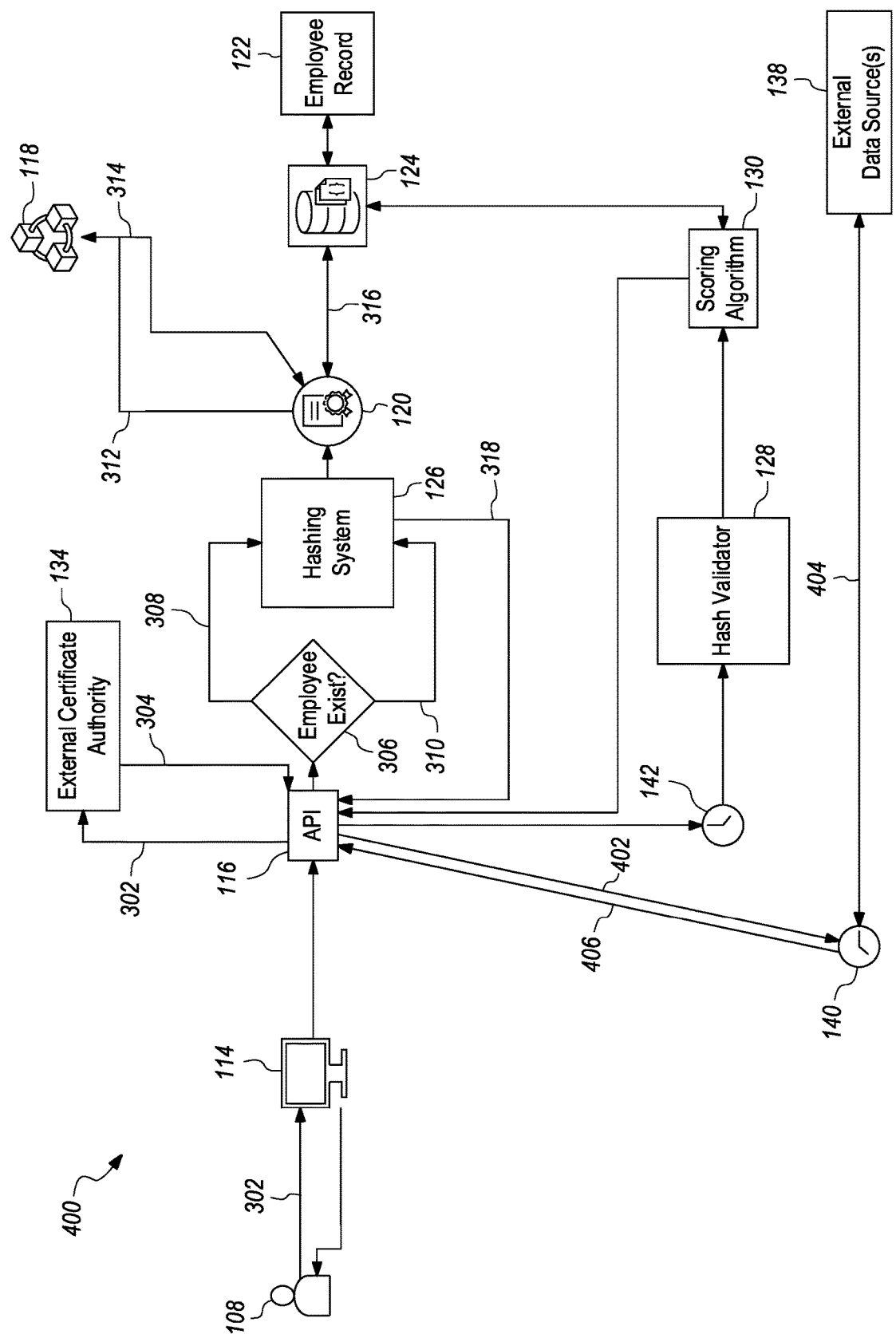
FIG. 4 is an example of a method for extracting or receiving employee data from one or more external sources.

FIG. 4 is an example of a method 400 for extracting employee performance data from the one or more external data sources 138. Thus, reference can be made to the example of FIGS. 1-3 in the example of FIG. 4. Employers (e.g., the employer 108) can extract employee performance data using an API so that the employers can seamlessly integrate existing data into the system 100, ensuring data consistency and saving time on data entry. The method 400 can begin at 402 with the API gateway 116 initiating a periodic (e.g., weekly) data extraction job. The API gateway 116 can cause the data scheduler 140 to initiate a data extraction process. The data scheduler 140 can be implemented as an API that can interface and/or interact with the one or more external data sources 138. The automated job can be scheduled to run at specified intervals (weekly, monthly, quarterly) to initiate the data extraction process. This could be a cron job or a scheduled task within the host 154. At 404 of the method 400, the data scheduler 140 can pull the employee performance data from the one or more external data sources 138. The data scheduler 140 can be tasked with pulling relevant employee performance data from the one or more external data sources 138, which can include, but not limited to, time tracking systems, project management tools, HR management systems, and more.

The data scheduler 140 can be configured with permissions and access rights to pull this data and that data privacy and security measures are adhered to during the extraction process. The extracted employee performance data is sent to the API gateway 116 for processing at 406. In some examples, the method 400 includes aggregating, normalizing, and preparing the data at the API gateway 116 for further processing (analysis). In some examples, the method 400 includes the API gateway 116 implementing a data validation step to check for completeness, accuracy, and integrity of the incoming data. In some examples of the method 400, before updating the employee record 122, the API gateway 116 can preprocess the employee performance data to fit a scoring model's requirements. This can involve data cleaning, transformation, and feature extraction. In some examples, the method 400 can include updating the employee record 122 according to one or more examples herein to include the employee performance data that is provided from the one or more external data sources 138. The updating of employee record 122 can be tracked by the host 154. The updated record can include a timestamp and/or version information to track when the last update occurred, and thus provides an audit trail for the employee record 122. For added transparency and immutability, the host 154 can record that an update occurred on the blockchain according to one or more examples as disclosed herein. This step can involve creating a transaction indicating employee data update for a particular employee and adding it to the blockchain ledger.

Figure 5:
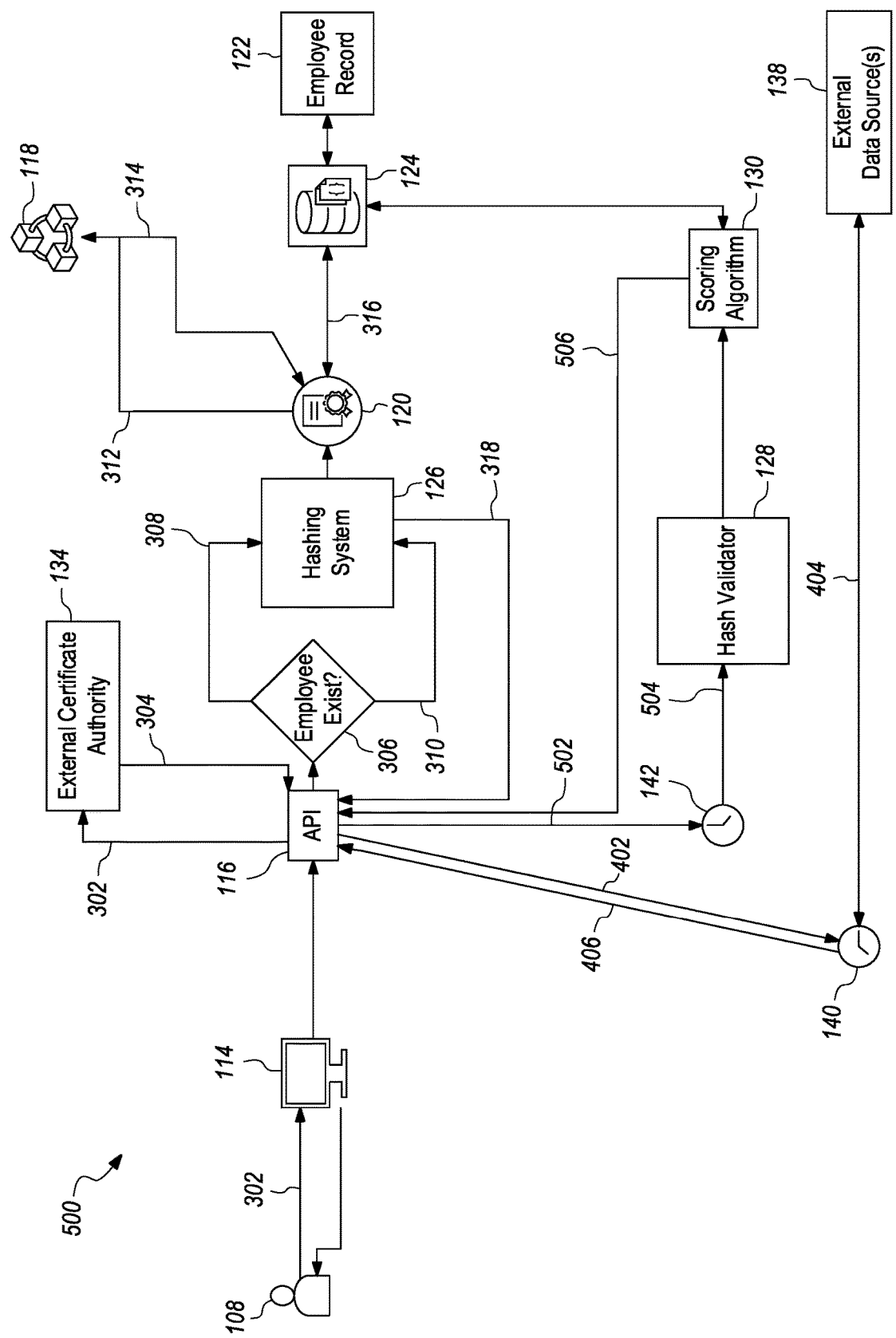
FIG. 5 is an example of a method for generating an employee performance score for an employee.

FIG. 5 is an example of a method 500 for generating an employee performance score using the system 100, as shown in FIG. 1. Thus, reference can be made to the example of FIGS. 1-4 in the example of FIG. 5. The method 500 can be used to periodically generate employee performance scores by executing the scoring algorithm 130, validating data integrity using the hash validator 128, and storing scores in the database 124, such as in the employee record 122. In some examples, score transactions can be recorded on a blockchain ledger for transparency and accuracy.

For example, the method 500 can begin at 502 with the API gateway 116 initiating the score job scheduler 142 at predefined intervals (e.g., weekly, monthly). This routine schedule ensures that employee performance scores are regularly updated to reflect recent performance data. The score job scheduler 142 can initiate the scoring algorithm 130 for computing the employee performance score. At 504, the hash validator 128 is used to check for data integrity such as of the employee record 122. For example, prior to scoring, the hash validator 128 checks the integrity of the ledger data by validating that it hasn't been tampered with since its last update. This can ensure that the data used to ensure that the data is trustworthy and has not been tampered with. The scoring algorithm 130 can be applied to each employee data record, taking into account their entire performance history, possibly across multiple employers. This comprehensive approach can ensure that the score accurately reflects the employee's skills and contributions. At 506 of the method 500, the employee performance score for the employee 110 can be provided back to the API gateway 116. This step acts as a bridge between the scoring logic and the system's data storage and blockchain ledger components. In some examples, the method 500 can include creating a blockchain transaction on the blockchain network 118. The API gateway 116 can cause a blockchain transaction to be created to log that an employee's score has been updated. This transaction can include a timestamp and a reference to the employee (e.g., the employee ID) but not the score itself to maintain privacy. In some examples, the method 500 can include storing the employee performance score for the employee 110 in the database 124. The employee performance score can be stored in decentralized storage, ensuring that it is securely archived and can be accessed as needed without relying on a central point of control.

Figure 6:
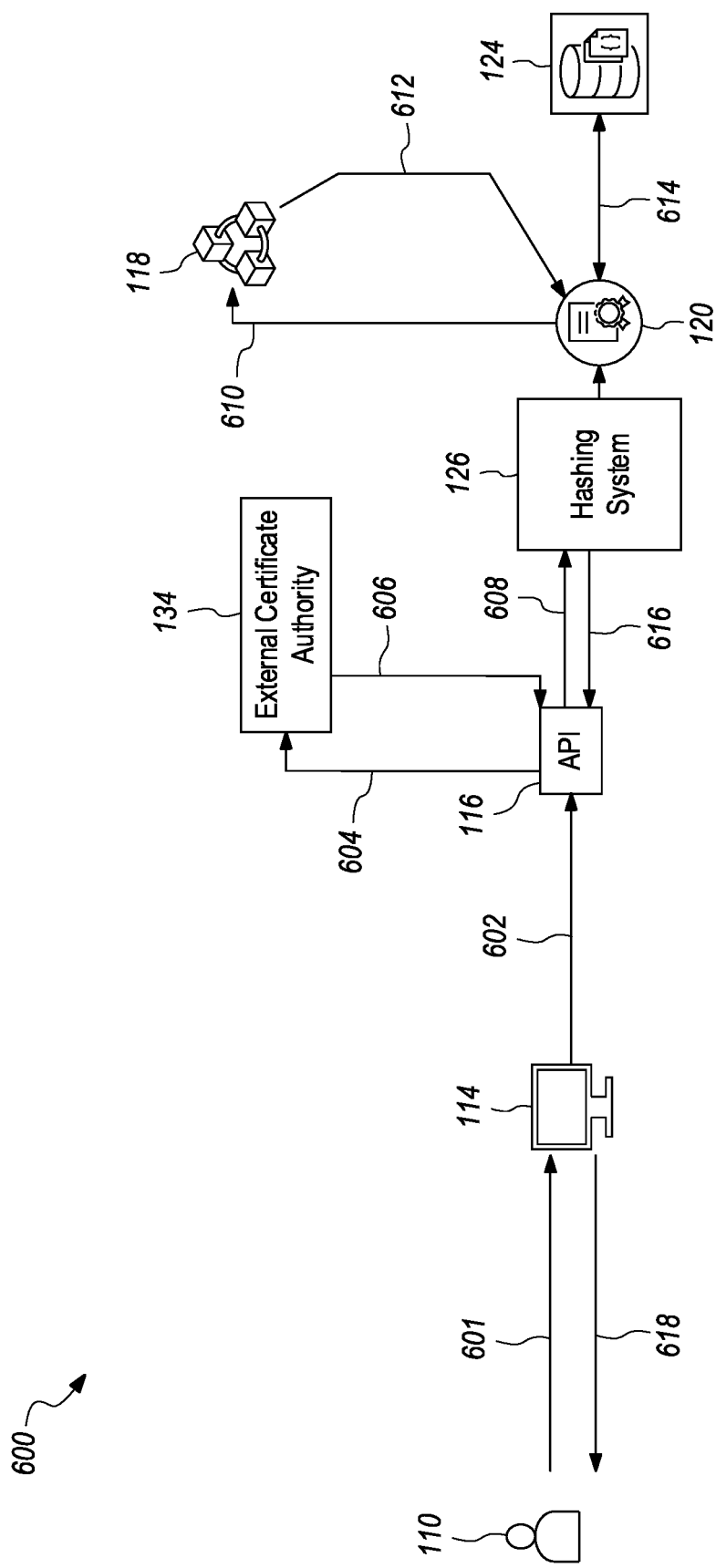
FIG. 6 is an example of a method for providing an employee with an employee performance score.

FIG. 6 is an example of a method 600 for providing an employee (e.g., the employee 110) with an employee performance score using the system 100, as shown in FIG. 1. Thus, reference can be made to the example of FIGS. 1-5 in the example of FIG. 6. Employees can generate and access their employee performance scores and/or reports from the system 100 so that the employees can securely and transparently view their performance history, leading to more reliable and tamper-proof record-keeping. The method 600 can begin at 601 with the employee 110 requesting the employee performance score from the system 100. At 602 of the method 600, the client 114 initiates a request for the employee performance score to the API gateway 116 of the host 154. The employee can log into the client 114 and request to view their performance score. At 604, the API gateway 116 can send a verification request to the ECA 134 to authenticate an identity of the employee 110. The ECA 134 can respond at 606 with an indication that the user is verified. The ECA verifies the employee's digital certificate and returns a verification status. At 608, the API gateway 116 instructs or causes the hashing system 126 to retrieve the employee record 122 for the employee 110 (the user). The hashing system 126 retrieves and verifies the employee record 122 as disclosed herein. For example, the hashing system 126 can compute the hash of the employee record 122 and compare the computed hash against a stored hash on the blockchain network 118 to ensure data integrity.

At 610, a transaction logging the employee score access request can be created. The transaction can include the employee's verified identity (e.g., the employee ID), a timestamp, and a score report requested (e.g., the employee performance score). This transaction is validated through the blockchain's consensus mechanism and added to the ledger, creating an immutable record of the access request according to one or more examples as disclosed herein. The blockchain network 118 can periodically conduct integrity checks on stored data, including the newly recorded access request transaction, to detect any tampering. At 612, the blockchain network 118 responds with an indication if a transaction is valid (e.g., successful or failed). Based on the outcome of the integrity checks and transaction validation, the blockchain network 118 responds to the system 100 with a success or failure status for the access request. The hashing system 126 can retrieve the employee record 122 from the database 124 in response to the blockchain response indicating success. Thus, if a blockchain response is successful and data integrity is confirmed, the host 154 can proceed to retrieve the employee record 122 for the employee 110. The hashing system 126 can extract the employee performance score for the employee 110 from the employee record and provides the employee performance score at 616 to the API gateway 116. In some examples, the employee performance score is provided from the blockchain network 118 based on the outcome of the integrity checks and transaction validation (e.g., being valid). At 618, the API gateway 116 can provide the employee performance score to the client 114. In some examples, an employees' score record, along with any relevant historical performance data, can be securely transmitted back to the client 114 for the employee 110 to view. In some examples, the method 600 can include providing the employee record 122 to the client 114 with the employee performance score or as an alternative to the employee performance score.

Figure 7:
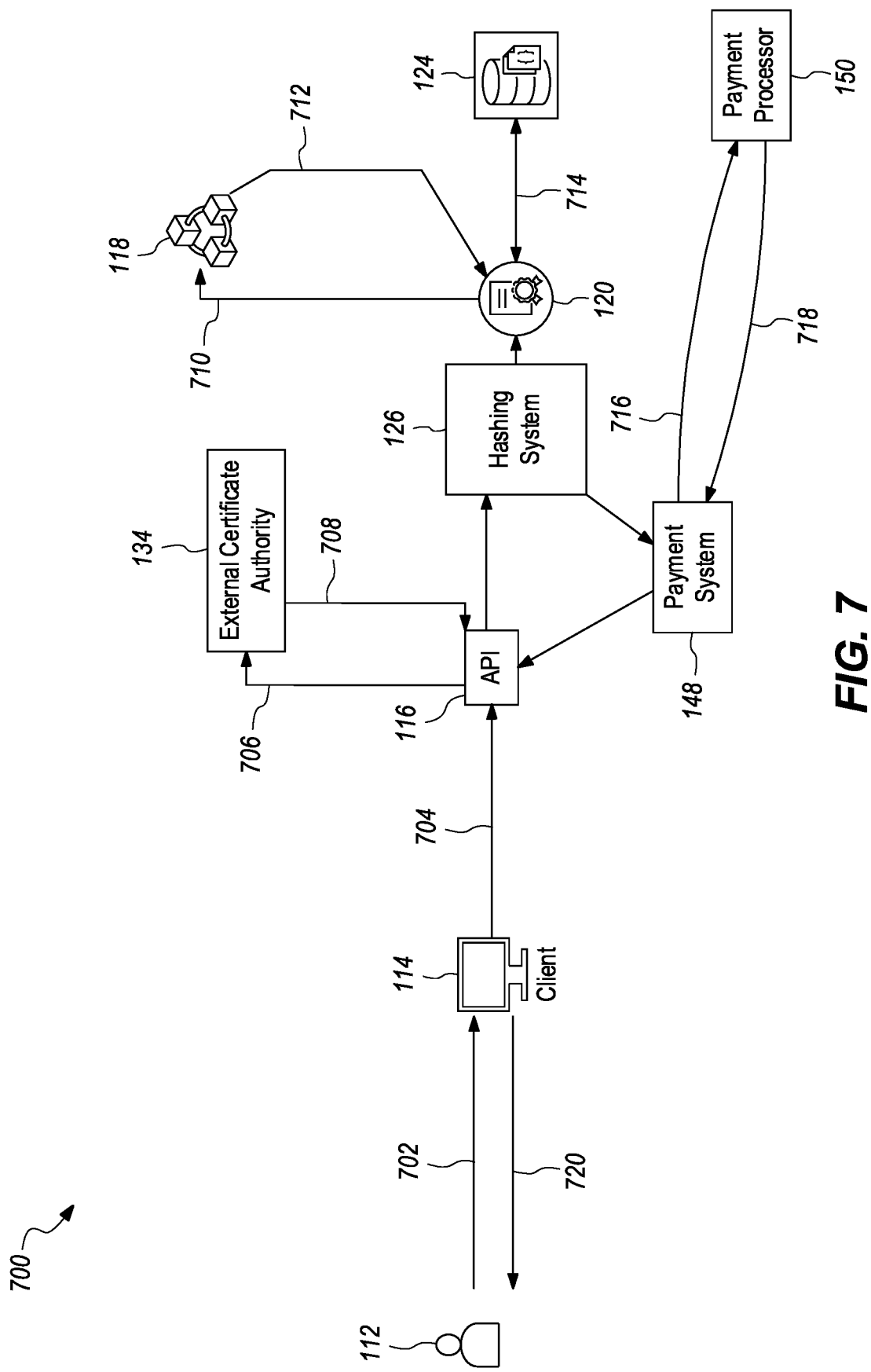
FIG. 7 is an example of a method for providing a requestor with an employee performance score for an employee.

FIG. 7 is an example of a method 700 for providing a requestor (e.g., the requestor 112) with an employee performance score for an employee (e.g., the employee 110) using the system 100, as shown in FIG. 1. Thus, reference can be made to the example of FIGS. 1-6 in the example of FIG. 7. Potential employers, employees, agencies, or private entities can request and access employee reports so that these requestors can evaluate potential hires based on verified and comprehensive work histories. The system 100 enables the employee performance score and/or employee performance report to be requested and accessed by potential employers, employees, and other entities. The requestors can evaluate potential hires based on verified and comprehensive work histories, resulting in better hiring decisions.

The method 700 can begin at 702 with the requestor 112 requesting to access the employee performance score for the employee 110 from the system 100. At 704, the client 114 initiates a request for the employee performance score to the API gateway 116 of the host 154. The requestor 112 can log into the client 114 and select an employee whose score the requestor 112 wants to access, and thus initiate the request process. In some examples, the method 700 can include prompting the requestor 112 using the client 114 for a fee to access the employee performance score. The payment process can be secure and support multiple payment methods for convenience. For example, the host 154 can communicate with the payment processor 150 to complete a transaction (payment) for the employee performance score. The payment processor 150 can provide feedback on a payment status (success or failure). In case of payment failure, the request process is halted, and the requestor 112 is informed via the client 114. At 706, the API gateway 116 sends a request to the ECA 134 to verify a requestor's digital certificate. At 708, the ECA responds with a verification status for the requestor 112. In case of verification failure, the client 114 displays an error message, and the request process is halted. In response to the user being verified, the API gateway 116 causes or instructs the hashing system 126 to retrieve the employee record 122 for the employee 110, which contains the employee performance score as part of the method 700. In some examples, the method 700 can include computing the hash of the retrieved data (the employee record 122) and comparing it against the stored hash on the blockchain on the blockchain network 118 at the hashing system 126 to ensure the data's integrity has not been compromised. At 710, a transaction on the blockchain is created to log an access request, including a requestor's verified identity, a timestamp, and details of a requested score report (or requested employee performance score). This transaction undergoes validation through the blockchain's consensus mechanism and, upon successful validation, is added to the blockchain ledger, ensuring an immutable record of the request. The blockchain network 118 periodically performs integrity checks on all stored data, including the newly recorded access request transactions, to detect any data tampering. At 712, depending on the outcome of the integrity checks and transaction validation, the blockchain network 118 responds with a success or failure status regarding the access request. At 714, the hashing system 126 can retrieve the employee record 122 from the database 124 in response to the blockchain network 118 indicating success. Thus, if the blockchain network 118 response indicates success and data integrity is confirmed, the hashing system 126 retrieves the employee record 122 from the database 124. In some examples, the payment system 148 allows the requestor 112 to split payment. For example, at 716, the payment made by the requestor 112 can be split between all contributing parties (data providers) as per predefined rules. This process can be transparent and adhere to agreed-upon terms. The payment processor 150 can communicate an indication whether payment is successful or not successful at 718. The API gateway 116 can provide the employee performance data and/or score to the client 114 in response to a payment process providing an indication that the payment was successful as part of the method 700. In some examples, at 720, the employee performance score for the employee 110 (or report) on the client 114 can be viewed the requestor 112. In some examples, the securely retrieved employee performance score, along with any relevant historical performance data, can be transmitted back to the client 114 for review.

In some examples, the system 100 can provide a software mechanism (or method) for employees, such as the employee 110 to appeal or contest data entries in the employee record 122. The mechanism ensures fairness and accuracy in data recording, maintaining system integrity. The use of an employee appeal method in the system 100 can ensure fairness and maintain an integrity of the employee record 122 within the system 100. To initiate the employee appeal method, the employee can 110 can review the employee record 122 for potential issues. For example, the employee 110 notices a discrepancy or issue with their data or performance score using the client 114. The employee 110 can submit an appeal (appeal request) using the client 114 to the host 154. A dedicated interface in the client 114 can be provided that the employee 110 can use to submit the appeal. This submission can include description of the issue or discrepancy and/or any supporting documents or evidence. Upon submission, the host 154 assigns a reference number to the appeal and provides an acknowledgement to the client, which can be provided to the employee 110. Thus, in some instances, upon submission, the system 100 can automatically acknowledge receipt of the appeal to the employee 110, and provide a reference number for tracking the appeal. The host 154 can implement an initial review of the appeal. In some examples, an automated or semi-automated initial review can be conducted by the host 154 to categorize the appeal based on its nature and urgency. The host 154 can escalate the appeal to relevant authority. For example, the host 154 can escalate the appeal to an appropriate authority or team within an organization, such as HR or a dedicated review committee, for further evaluation.

The authority can conduct an investigation into the appeal, which can include, but not limited to, reviewing the employee's submitted evidence, consulting the data entry, extraction, and processing logs, and/or collaborating with data providers or system administrators to understand potential sources of error. Based on the investigation, a decision is made regarding the appeal. This decision could involve correcting the data, upholding the original entry, or other remedial actions. The outcome of the appeal, along with a detailed rationale, can be recorded in the system 100, in some instances, as part of the employee record 122, for transparency and auditability. The host 154 can communicate an outcome of the appeal to the client 114 for the employee 110. The decision can be communicated to the employee 110 through the client 114, along with an explanation and any next steps. In some examples, if the appeal is upheld, necessary corrections can be made to the employee's data or score, ensuring the changes are accurately reflected in the system. The employee 110 can be given the opportunity via the client 114 to provide feedback on the appeal process. Insights gained from the appeal process can be used to refine data entry, extraction, and processing algorithms of the system 100 to prevent similar issues in the future. Any systemic issues or trends identified through appeals can lead to updates in policies, processes, or system functionalities to enhance accuracy and fairness of the system 100.

In some examples, the system 100 can provide a software mechanism (or method) to allow employers to register with the system 100 for continuous report data and submission. For example, the employer 108 can access a registration interface or portable on the client 114. The employer 108 can use the registration interface to submit registration details. The employer 108 can fill out a registration form, providing essential details such as, a company name, contact information, an employer identification number, business registration details, and/or details of a contact person for a company, such as an HR manager or equivalent. The client 114 can provide the registration details to the host 154. In some examples, the registration details include a username and password for accessing the host 154. The host 154 can conduct an initial automated check to verify a completeness and format of submitted information (the registration details). The host 154 can integrate with external databases or services to verify the employer's business registration and legitimacy. In cases where automatic verification is inconclusive or flags issues, a manual review by system administrators or a dedicated team can be implemented. The host 154 upon successful verification creates an account for the employer 108 within the system 100. The client 114 can be used to guide the employer 108 through an initial setup process, which can include, but not limited to, setting up organization structure (departments, teams), and configuring data integration settings for existing applications, HR systems or databases.

Figure 8:
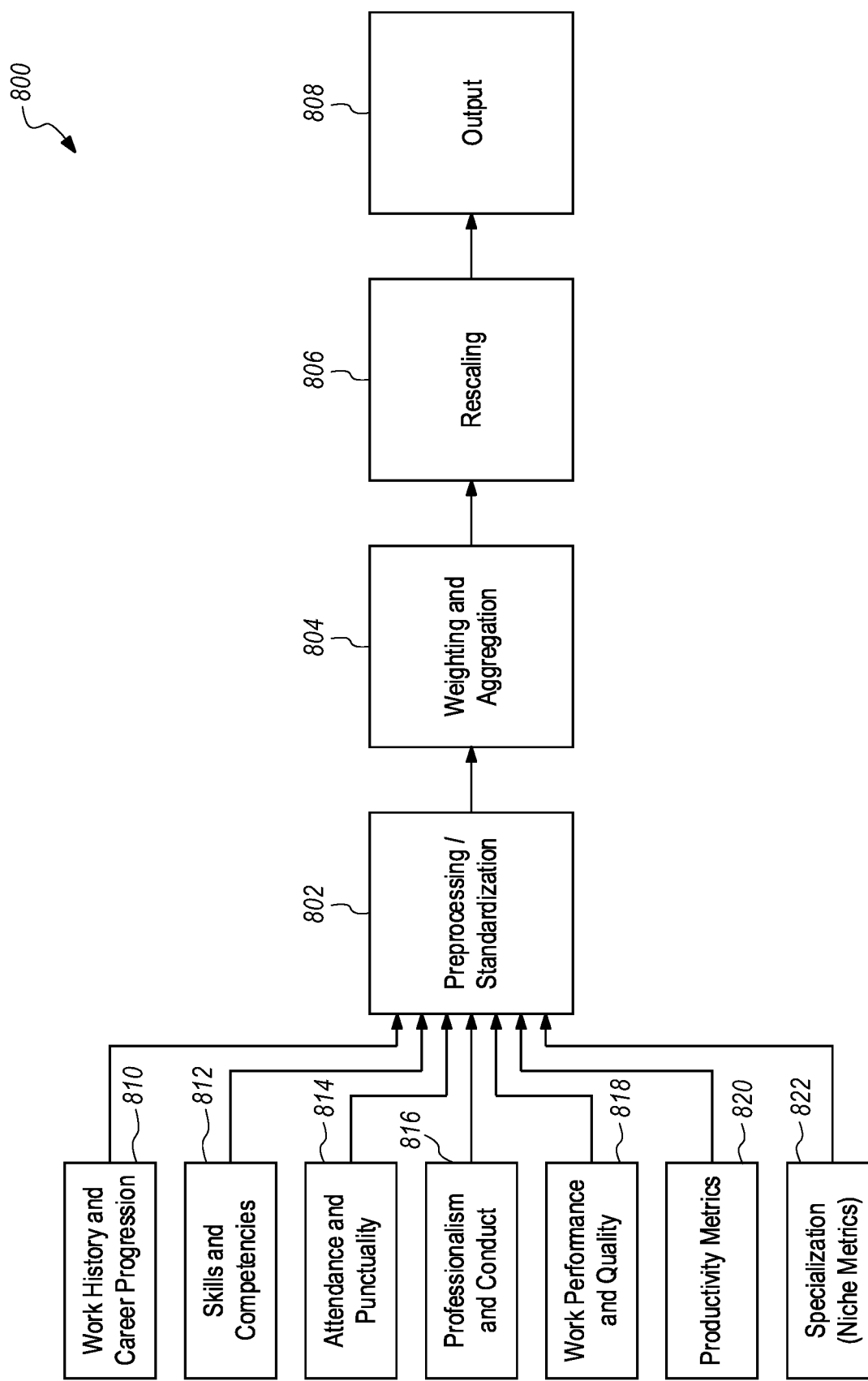
FIG. 8 is an example of a method for computing an employee performance score for an employee.

FIG. 8 is an example of a method 800 for computing an employee performance score for an employee, such as the employee 110. The method 800 can be implemented by the scoring algorithm 130, as shown in FIG. 1. Thus, reference can be made to one or more examples of FIGS. 1-7 in the example of FIG. 8. The scoring algorithm 130 can use weighted scoring with linear transformation.

The method 800 can begin at 802 a category scoring step. For example, at 802, each data category 810-822 can be scored on a common scale (e.g., 0 to 100) based on specific criteria relevant to that category. At 804, then, these scores can be weighted according to importance and aggregated into a final score. At 806, the aggregated score can be rescaled to fit a defined range, as a non-limiting example, the defined range is a 300-850 range. At 808, the rescaled score can be outputted as the employee performance score.

The data category 810 can be a work history and career progression data category. The scoring algorithm 130 can identify relevant data based on the work history and career progression data category from the employee record 122 for computing a work history and career progression score. The work history and career progression data category can include criteria such as years of experience, number of promotions and a variety of roles that the scoring algorithm 130 can use to locate the relevant data from the employee record 122. For example, at step 802, for an employee with 10 years of experience, 2 promotions, and experience in 3 different roles, the scoring algorithm 130 can compute a 80/100 as the work history and career progression score.

The data category 812 can be a skill and competence data category. The scoring algorithm 130 can identify relevant data based on the skill and competence data category from the employee record 122 for computing a skill and competence score. The skill and competence data category can include criteria such as number of relevant certifications, skill assessment scores, completed training courses that the scoring algorithm 130 can use to locate the relevant data from the employee record 122. For example, at step 802, for an employee with 5 relevant certifications, high skill assessment scores, and 10 completed training courses, the scoring algorithm 130 can compute a 90/100 as the skill and competence score.

The data category 814 can be an attendance and punctuality data category. The scoring algorithm 130 can identify relevant data based on the attendance and punctuality data category from the employee record 122 for computing an attendance and punctuality score. The attendance and punctuality data category can include criteria such as percentage of days attended and instances of tardiness that the scoring algorithm 130 can use to locate the relevant data from the employee record 122. For example, at step 802, for an employee with 98% attendance and fewer than 3 instances of tardiness in a year, the scoring algorithm 130 can compute a 95/100 as the attendance and punctuality score.

The data category 816 can be a professional and conduct data category. The scoring algorithm 130 can identify relevant data based on the professional and conduct data category from the employee record 122 for computing a professional and conduct score. The professional and conduct data category can include criteria such as peer and supervisor reviews, and disciplinary records that the scoring algorithm 130 can use to locate the relevant data from the employee record 122. For example, at step 802, for an employee with consistently positive reviews and no disciplinary actions, the scoring algorithm 130 can compute a 85/100 as the professional and conduct score.

The data category 818 can be a work performance and quality data category. The scoring algorithm 130 can identify relevant data based on the work performance and quality data category from the employee record 122 for computing a work performance and quality score. The work performance and quality data category can include criteria such as achievement of performance targets, error rates, and customer feedback that the scoring algorithm 130 can use to locate the relevant data from the employee record 122. For example, at step 802, for an employee who meets or exceeds all performance targets, has low error rates, and positive customer feedback, the scoring algorithm 130 can compute a 90/100 as the work performance and quality score.

The data category 820 can be a productivity metrics data category. The scoring algorithm 130 can identify relevant data based on the productivity metrics data category from the employee record 122 for computing a productivity metrics score. The productivity metrics category can include criteria such as task completion rates, volume of work completed, and adherence to deadlines that the scoring algorithm 130 can use to locate the relevant data from the employee record 122. For example, at step 802, for an employee who consistently completes tasks on time, handles a high volume of work, and meets all deadlines, the scoring algorithm 130 can compute a 88/100 as the productivity metrics score.

In some examples, industry-specific metrics can be incorporated or used by the scoring algorithm 130. Incorporating industry-specific metrics into the scoring algorithm 130 can tailor an evaluation to unique aspects of each job function, regulatory requirements, and market dynamics. These metrics can add depth to the evaluation by highlighting the skills and achievements that are particularly valuable in a given industry. Examples are presented herein for integrating industry-specific metrics into the scoring algorithm 130 with respect to a healthcare industry, technology industry and financial industry.

For example, a nurse can be evaluated on patient care quality, adherence to health and safety protocols, and efficiency in patient record management, reflecting the critical aspects of healthcare work. The metrics that can be incorporated into the scoring algorithm 130 can include patient satisfaction scores, compliance with healthcare regulations, number of successful procedures, adherence to sanitation protocols. In some examples additional metrics can be incorporated as well, such as code quality (e.g., number of bugs per thousand lines of code), project delivery times, innovation (e.g., patents filed, products launched), and proficiency in key technologies. For example, the scoring algorithm 130 can compute a software developer's score based on metrics such as efficiency in resolving issues, contributions to product development, and proficiency in relevant programming languages or technologies. In addition to the general metrics, the software developer's industry-specific score can include code quality: 92/100, project delivery time: 85/100, and innovation: 80/100. If these industry-specific metrics are weighted to represent 30% of the total score, their contribution to the overall score can be calculated accordingly, and the final score can be adjusted to reflect the added depth and specificity of the evaluation. For example, the scoring algorithm 130 can compute a score for a financial analyst based on metrics such as accuracy of financial reporting, compliance with financial regulations, client portfolio performance, and risk management effectiveness. The financial analyst can be evaluated on the accuracy of their forecasts, the performance of the portfolios they manage, and their compliance with industry regulations.

By way of example, if an equal weighting for simplicity is assumed (that is each category is 16.67% of a total percentage), the weighted score would be calculated by the scoring algorithm 130 as follows at step 804: Total Weighted Score=(80*0.1667)+(90*0.1667)+(95*0.1667)+(85*0.1667)+(90*0.1667)+(88*0.1667).

After calculating the total weighted score (which will be on a 0-100 scale due to the weights), the scoring algorithm 130 can rescale this to the example range of 300-850 range at step 806 as follows: Adjusted Score=300+(Total Weighted Score*(550/100)). For example, if the Total Weighted Score is computed to come out to 88 (out of 100), the final rescaled score can be calculated by the scoring algorithm 130 as follows: Adjusted Score=300+(88*5.5)=784. Thus, this employee can have an overall performance score (the employee performance score) of 784 on the 300-850 scale, indicating a high level of performance across all measured categories.

In some examples, the scoring algorithm 130 can include an ensemble learning method for computing the employee performance score. For example, the scoring algorithm 130 can use ensemble algorithms such as Random Forest, Gradient Boosting Machines (GBMs), and/or XGBoost to combine predictions from multiple machine learning algorithms to produce more accurate results than any single model. This diversity makes the ensemble less likely to over fit to a particular set of data. Employee performance data can be varied. From quantitative metrics like sales numbers or project completion rates to qualitative assessments like peer reviews. The scoring algorithm 130 can include a number of machine learning models that have been trained on one or more specific data points from past or historical employee performance data. Each machine learning model can provide an employee performance score prediction. For example, a first machine learning model can provide a score indicative of an employee attendance, and a second machine learning model of the scoring algorithm 130 can provide a score indicative of project delivery time. The employee performance score predictions can be processed by the scoring algorithm 130 to provide the employee performance score. For example, the scoring algorithm 130 can aggregate the employee performance score predictions to provide the employee performance score. Different models within an ensemble can be tailored to different aspects of the employee performance data. For instance, a first machine learning model can be trained on time-series data (e.g., attendance patterns), while a second machine learning model can be trained on categorical data (e.g., job roles).

In some examples, the machine learning models used by the scoring algorithm 130 can be customizable in some instances and thus allow for domain-specific adjustments. Different industries might have different performance indicators. Customizing models to reflect industry-specific metrics ensures that the scoring algorithm 130 can be accurately used in many sectors. In some examples, the models of the scoring algorithm 130 can be customized for industry variability. Within the same industry, different roles might require different evaluation criteria. Tailoring models to these nuances can ensure that employees are evaluated fairly based on their specific job responsibilities.

FIG. 9 is an example of a portion of pseudocode 900 that can be used for implementing the scoring algorithm 130, as shown in FIG. 1. Thus, reference can be made to one or more examples of FIG. 1-8 in the example of FIG. 9. The pseudocode 900 can be executed on the computing system 102. The pseudocode 900 can be stored as machine-readable instructions in the memory 106 of the computing system 102 and retrieved by the processor 104 of the computing system 102. The processor 104 can execute the machine-readable instructions of the pseudocode 900 to compute the employee performance score for the employee 110.

Figure 10:
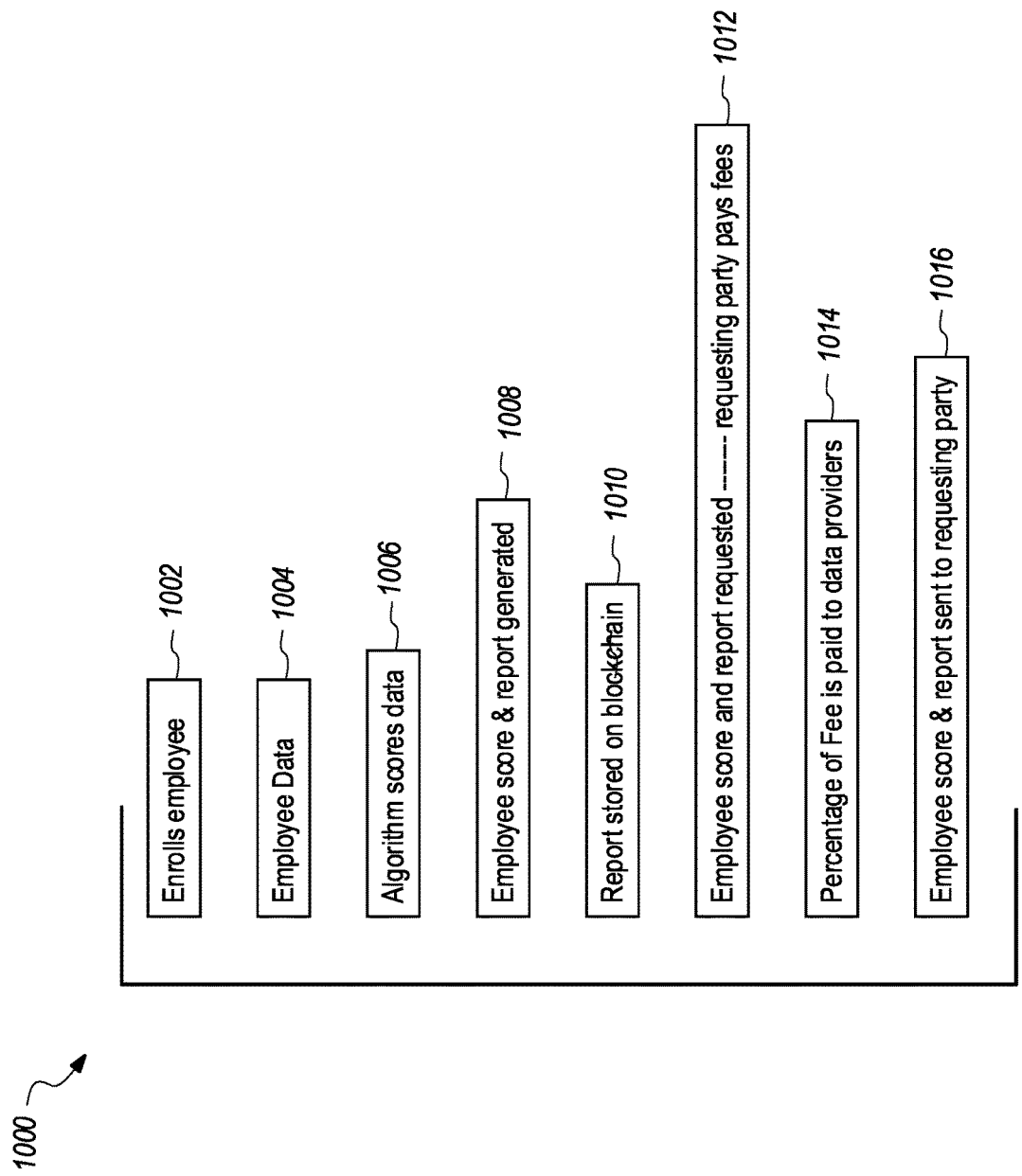
FIG. 10 is an example of a method for generating an employee performance score and report.

FIG. 10 is an example of a method 1000 for generating an employee performance score and report. One or more steps of method 1000 can be implemented by the host 154, as shown in FIG. 1. Thus, reference can be made to one or more examples of FIGS. 1-9 in the example of FIG. 10. The method 1000 can begin at 1002 with the employer 108 enrolling the employee 110 into the system 100 using the client 114. At 1004, the employer 108 uses the client 114 and/or the one or more external data sources 138 can be configured to provide employee performance data (attendance, productivity, and/or performance, etc.) for the employee 110. The host 154 can generate an employee record, such as the employee record 122, as shown in FIG. 1. The employee performance data can be provided periodically (e.g., routinely), as disclosed herein. At 1006, the scoring algorithm 130 can be invoked to compute an employee performance score for the employee 110 based on the employee record 122. For example, the scoring algorithm 130 can compute the employee performance score based on the employee performance data in the employee record 122. At 1008, the host 154 can generate an employee performance report and the employee performance score. In some examples, the report includes the employee performance score. At 1010, the employee performance score and employee performance report can be stored on the blockchain network 118, as shown in FIG. 1. The employee performance score and/or employee performance report can be made available for request and/or use by an entity (e.g., a potential employer, private parties, governmental agencies), such as the requestor 112, as shown in FIG. 1. At 1012, the requestor 112 can request the employee performance score and/or employee performance report and pay a fee to complete the request. At 1014, fee percentages can be distributed to data providers both current and previous employers. At 1016, the employee performance score and/or employee performance report can be sent to the requestor 112.

Figure 11:
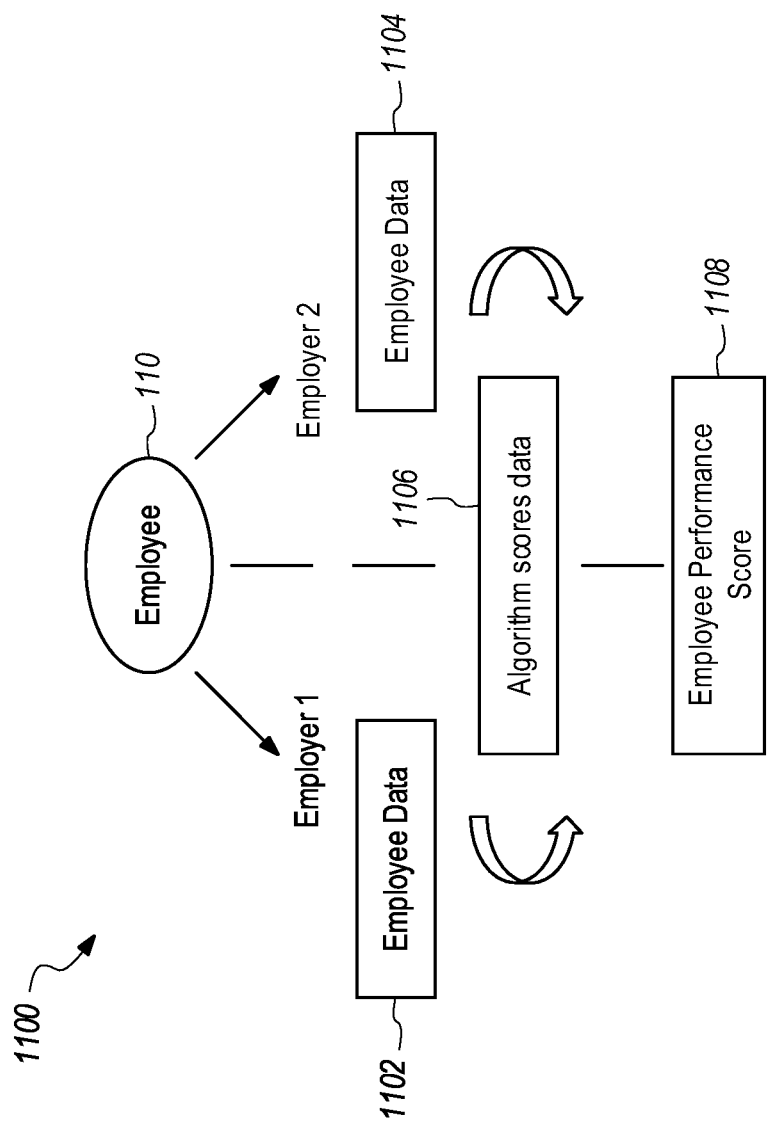
FIG. 11 is an example of a method of multiple employers providing employee performance data for an employee record for generating an employee performance score.

FIG. 11 is an example of a method 1100 of multiple employers providing employee performance data for an employee record (e.g., the employee record 122, as shown in FIG. 1) for the employee 110 to the system 100, as shown in FIG. 1. One or more steps of method 1100 can be implemented by the host 154 of the system 100. Thus, reference can be made to one or more examples of FIGS. 1-10 in the example of FIG. 11. The method 1100 can begin at 1102 with a first employer providing employee performance data for the employee 110 to the host 154. At 1104, a second employer can provide employee performance data for the employee 110 to the host 154. At 1106, the scoring algorithm 130 can compute an employee performance score 1108 for the employee 110 based on the provided employee performance data from each of the first and second employers. The scoring algorithm 130 can take all data into account from both the first and second employers for producing the employee performance score 1108. For example, the scoring algorithm 130 can compute the employee performance score 1108 based on the employee performance data in the employee record 122, which is a function of the employee performance data provided by the first and second employers.

In some scenarios, on average it may take about 3-4 weeks to hire an applicant in conventional practice. In today's climate, with staffing shortages that's entirely too long. One goal is to employ qualified applicants in the shortest amount of time without placing a burden on the employer. The system 100 will assist with doing just that. The system 100 can provide employers access to current and past work history including the amount of time on the job, position held and current wages. In addition to these things, it also allows employers to view performance. By having an overview on how an applicant performs at their current and past job, potential employers can make a confident decision on moving forward in the interviewing/hiring process. This is imperative when selecting the best candidate for the job. In embodiments, include a platform corresponding to the system 100 may be used that has one or more servers configured to communicate over a data network with multiple users operating applications on remote computing devices. The applications may be an application such as a downloadable application running on a computing device or an application accessed through a web browser on the computing device. In further embodiments, multiple employers can enter data for a person, a report requestor can pay fees to obtain reports generated by the platform, and a portion of fees can be distributed by the platform to current and prior employers.

Aspects of the embodiments for an exemplary system including a platform (and components thereof such as a database) may be implemented electronically using hardware, software modules, firmware, tangible computer readable or computer usable storage media having instructions stored thereon, or a combination thereof and may be implemented in one or more computing systems or other processing systems. In embodiments, a platform including its components may be implemented electronically using hardware, software modules, firmware, tangible computer readable or computer usable storage media having instructions stored thereon, or a combination thereof and may be implemented in one or more computing systems or other processing systems at the same location or different locations. Example computing devices (such as remote computing devices) that may be used by remote users include, but are not limited to, a mobile computing device (such as a smartphone or tablet computer), a desktop computer, laptop computer, set-top box, smart television, smart display screen, kiosk, or other type of computing device having at least one processor and computer-readable memory. In addition to at least one processor and memory, such a computing device may include software, firmware, hardware, or a combination thereof. Software may include one or more applications, a browser, and an operating system. Hardware can include, but is not limited to, a processor, memory, display or other input/output device. Embodiments may be directed to computer products comprising software stored on any computer usable medium such as memory. Such software, when executed in one or more data processing devices, causes a data processing device(s) to operate as described herein.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computing system of FIG. 12. Thus, reference can be made to one or more examples of FIGS. 1-11 in the example of FIG. 12.

Figure 12:
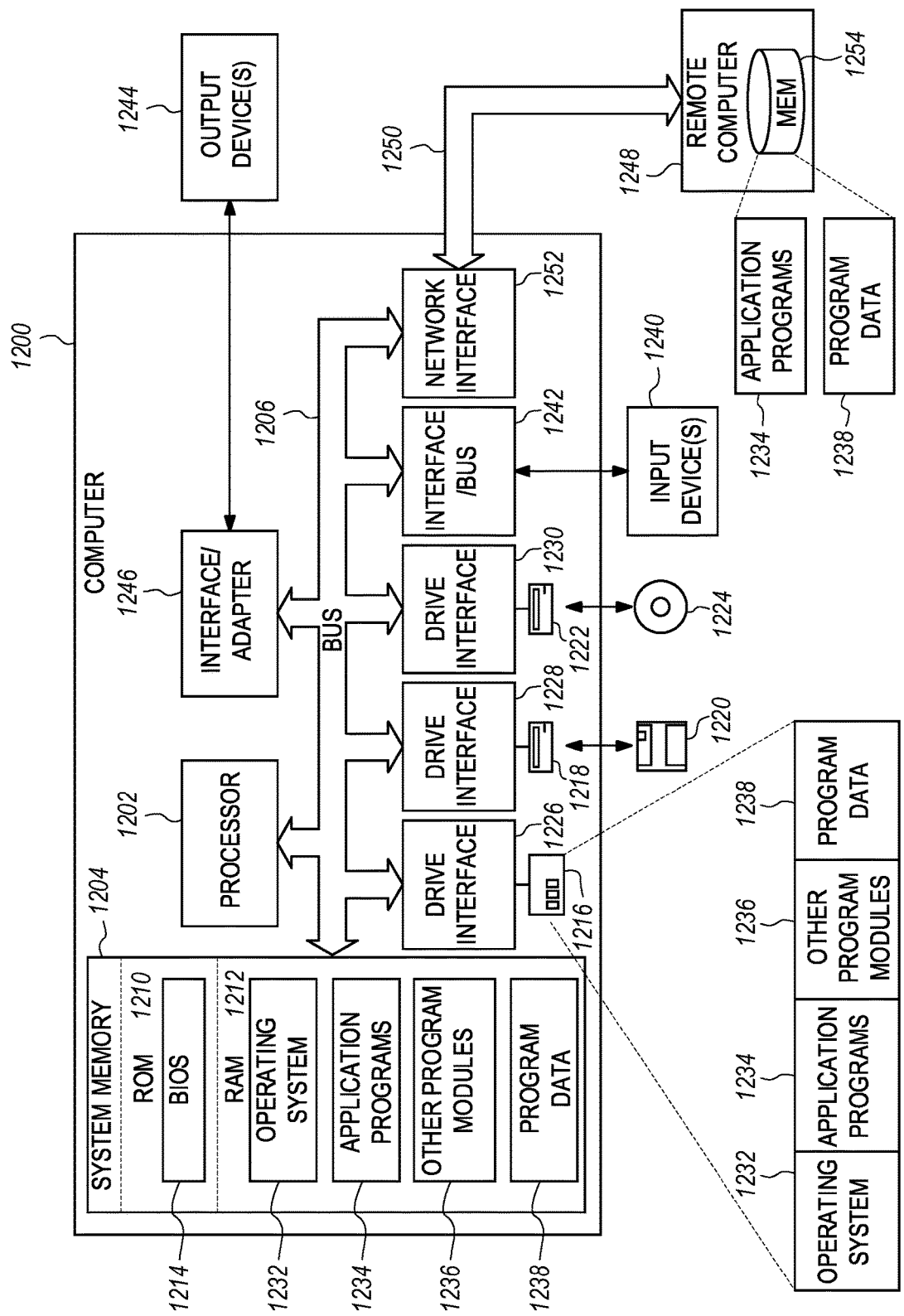
FIG. 12 is a block diagram of a computing environment that can be used to perform one or more methods according to an aspect of the present disclosure.

In this regard, FIG. 12 illustrates one example of a computing system 1200 that can be employed to execute one or more embodiments of the present disclosure. In some examples, the computing system 1200 is the computing system 102, as shown in FIG. 1. The computing system 1200 can be implemented on one or more general purpose networked computing systems, embedded computing systems, routers, switches, server devices, client devices, various intermediate devices/nodes or standalone computing systems. Additionally, computing system 1200 can be implemented on various mobile clients such as, for example, a personal digital assistant (PDA), laptop computer, pager, and the like, provided it includes sufficient processing capabilities.

Computing system 1200 includes processing unit 1202, system memory 1204, and system bus 1206 that couples various system components, including the system memory 1204, to processing unit 1202. Dual microprocessors and other multi-processor architectures also can be used as processing unit 1202. System bus 1206 may be any of several types of bus structure including a memory bus or memory controller, a peripheral bus, and a local bus using any of a variety of bus architectures. System memory 1204 includes read only memory (ROM) 1210 and random access memory (RAM) 1212. A basic input/output system (BIOS) 1214 can reside in ROM 1212 containing the basic routines that help to transfer information among elements within computing system 1200.

Computing system 1200 can include a hard disk drive 1216, magnetic disk drive 1218, e.g., to read from or write to removable disk 1220, and an optical disk drive 1222, e.g., for reading CD-ROM disk 1224 or to read from or write to other optical media. Hard disk drive 1216, magnetic disk drive 1218, and optical disk drive 1222 are connected to system bus 1206 by a hard disk drive interface 1226, a magnetic disk drive interface 1228, and an optical drive interface 1230, respectively. The drives and associated computer-readable media provide nonvolatile storage of data, data structures, and computer-executable instructions for computing system 1200. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and disclosed herein. A number of program modules may be stored in drives and RAM 1210, including operating system 1232, one or more application programs 1234, other program modules 1236, and program data 1238. In some examples, the application programs 1234 can include one or more modules (or block diagrams), or systems, as shown and disclosed herein.

A user may enter commands and information into the computing system 1200 through one or more input devices 1240, such as a pointing device (e.g., a mouse, touch screen), keyboard, microphone, joystick, game pad, scanner, and the like. These and other input devices are often connected to processing unit 1202 through a corresponding port interface 1242 that is coupled to the system bus, but may be connected by other interfaces, such as a parallel port, serial port, or universal serial bus (USB). One or more output devices 1244 (e.g., display, a monitor, printer, projector, or other type of displaying device) is also connected to system bus 1206 via interface 1246, such as a video adapter.

The computing system 1200 may operate in a networked environment using logical connections to one or more remote computers, such as remote computer 1248. Remote computer 1248 may be a workstation, computing system, router, peer device, or other common network node, and typically includes many or all the elements described relative to computing system 1200. The logical connections, schematically indicated at 1250, can include a local area network (LAN) and a wide area network (WAN). When used in a LAN networking environment, the computing system 1200 can be connected to the local network through a network interface or adapter 1252. When used in a WAN networking environment, computing system 1200 can include a modem, or can be connected to a communications server on the LAN. The modem, which may be internal or external, can be connected to system bus 1206 via an appropriate port interface. In a networked environment, application programs 1234 or program data 1238 depicted relative to computing system 1200, or portions thereof, may be stored in a remote memory storage device 1254.

Although this disclosure includes a detailed description on a computing system and/or computer, implementation of the teachings recited herein are not limited to only such computing systems. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models (e.g., software as a service (SaaS, platform as a service (PaaS), and/or infrastructure as a service (IaaS)) and at least four deployment models (e.g., private cloud, community cloud, public cloud, and/or hybrid cloud). A cloud computing environment can be service oriented with a focus on statelessness, low coupling, modularity, and semantic interoperability.

Figure 13:
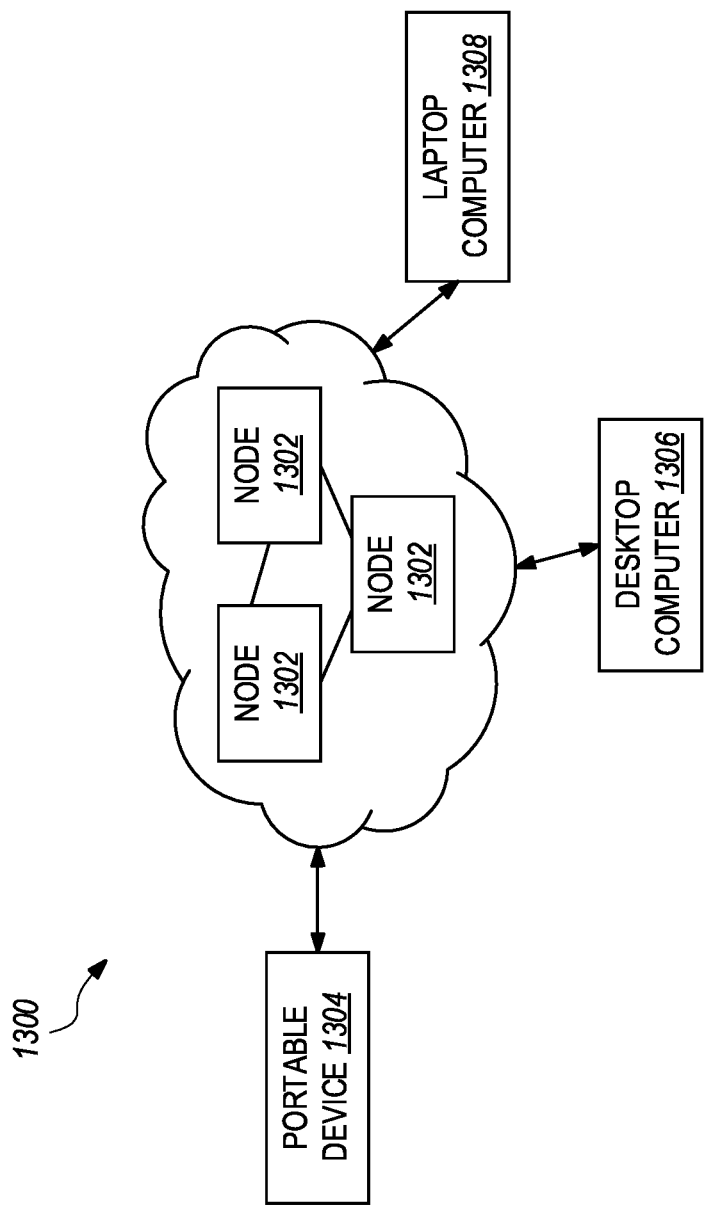
FIG. 13 is a block diagram of a cloud computing environment that can be used to perform one or more methods according to an aspect of the present disclosure.

FIG. 13 is an example of a cloud computing environment 1300 that can be used for implementing one or more modules and/or systems in accordance with one or more examples, as disclosed herein. Thus, reference can be made to one or more examples of FIGS. 1-12 in the example of FIG. 13. As shown, cloud computing environment 1300 can include one or more cloud computing nodes 1302 with which local computing devices used by cloud consumers (or users), such as, for example, personal digital assistant (PDA), cellular, or portable device 1304, a desktop computer 1306, and/or a laptop computer 1308, may communicate. The computing nodes 1302 can communicate with one another. In some examples, the computing nodes 1302 can be grouped (not shown) physically or virtually, in one or more networks, such as Private, Community, Public, or Hybrid clouds, or a combination thereof. This allows the cloud computing environment 1300 to offer infrastructure, platforms and/or software as services for which a cloud consumer does not need to maintain resources on a local computing device. The devices 1304-1308, as shown in FIG. 13, are intended to be illustrative and that computing nodes 1302 and cloud computing environment 1300 can communicate with any type of computerized device over any type of network and/or network addressable connection (e.g., using a web browser). In some examples, the one or more computing nodes can be used to implement modules, platforms, and/or systems, as disclosed herein.

In some examples, the cloud computing environment 1300 can provide one or more functional abstraction layers. It is to be understood that the cloud computing environment 1300 need not provide all of the one or more functional abstraction layers (and corresponding functions and/or components), as disclosed herein. For example, the cloud computing environment 1300 can provide a hardware and software layer that can include hardware and software components. Examples of hardware components include: mainframes; RISC (Reduced Instruction Set Computer) architecture based servers; servers; blade servers; storage devices; and networks and networking components. In some embodiments, software components include network application server software and database software.

In some examples, the cloud computing environment 1300 can provide a virtualization layer that provides an abstraction layer from which the following examples of virtual entities may be provided: virtual servers; virtual storage; virtual networks, including virtual private networks; virtual applications and operating systems; and virtual clients. In some examples, the cloud computing environment 1300 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 1300, and billing or invoicing for consumption of these resources. In one example, these resources may include application software licenses. Security provides identity verification for cloud consumers and tasks, as well as protection for data and other resources. The management layer can also provide a user portal that provides access to the cloud computing environment 1300 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing resources for which a future requirement is anticipated in accordance with an SLA.

In some examples, the cloud computing environment 1300 can provide a workloads layer that provides examples of functionality for which the cloud computing environment 1300 may be utilized. Examples of workloads and functions which may be provided from this layer include: mapping and navigation; software development and lifecycle management; virtual classroom education delivery; data analytics processing; and transaction processing. Various embodiments of the present disclosure can utilize the cloud computing environment 1300.

Additional Embodiments Include:

Embodiment A: A computer-implemented method for managing employment history on a cloud computing platform, comprising: enabling multiple entities (such as different employers) to enter employment data (attendance, productivity, performance) on the platform during respective employment periods of an employee; storing the employment data for the employee on a database; calculating a score based the stored employment data (employee data× time on the job×work history=score); and generating a report including the calculated score for output by the platform to a requesting entity.

The computer-implemented method of Embodiment A, further comprising: enabling the requesting entity to pay a fee for a generated report; and distributing fee percentages to current and previous employers based on information in the generated report.

The computer-implemented method of Embodiment A, wherein the storing the employment data for the employee on a database comprise storing the employment data on a blockchain and further comprising storing calculated scores and generated reports on the blockchain.

Embodiment B: A system for implementing the method of managing employment history on a cloud computing platform as in Embodiment A.

Embodiment C: A non-transitory computer-readable medium system for storing machine-readable instructions, which when executed by a processor of an electronic device, cause the electronic device to managing employment history on a cloud computing platform as in Embodiment A.

Embodiment D: A system comprising a host implemented on at least one processor and configured to synchronize employee performance data obtained from multiple employers over a data network; and a client device, coupled to the host, wherein the client device includes an application configured to communicate with the host and enable a requestor to access an employee performance report.

Embodiment E: A computer-implemented method for managing employment history on a cloud computing platform implemented on at least one processor, comprising: enabling multiple entities to enter employment data on the platform during respective employment periods of an employee; storing the employment data for the employee on a database; calculating a score with at least one processor based the stored employment data; and generating a report including the calculated score for output by the platform to a requesting entity.

Each of embodiments A through E may have one or more of the following additional elements in any combination: Element 1: wherein the host is further configured to enable the requestor using the application on the client device to query or search for an employee performance report; Element 2: wherein the host includes an application programming interface (API) gateway; Element 3: wherein the API gateway is configured to communicate with the client device and a blockchain network having multiple nodes managed by different employers; Element 4: wherein each node in the blockchain network maintains a decentralized ledger of transactions relating to employee records stored on the blockchain network; Element 5: wherein each transaction including those creating, updating or deleting data for an employee record, is validated by a respective node to the blockchain network, and changes or additions to the decentralized ledger of transactions is reflected in copies of the decentralized ledger at other nodes based on a consensus mechanism among nodes which validate changes or additions to the decentralized ledger; Element 6: wherein the blockchain network further stores an electronic smart contract defining functions that can be performed on the blockchain network including creating accessing, modifying or updating data in an employee record; Element 7: wherein the API gateway is further configured to control access between applications on multiple client devices making requests to the host, and to distribute the requests across different nodes of the blockchain network to distributed workload among the nodes; Element 8: further comprising a database for storing employee records, wherein the database comprises a distributed storage database having a distributed file system configured to address data based on its content hash; Element 9: wherein the host further includes a hashing system, and wherein the hashing system is configured to break down digital data representative of an employee record into blocks and to hash each block with a cryptographic function to obtain a unique content identifier, and wherein the unique content identifier is stored on the blockchain network or the database; Element 10: wherein the host further includes a hashing system, and wherein the API gateway is configured to evaluate a type of request, and the hashing system sends a transaction to the smart contract on the blockchain network based on the type of request; Element 11: wherein the smart contract executes logic to validate a request, and when validated, sends a validation reply indicating an employer or requestor is authorized to make the request along with a cryptographic hash of a node address and a unique content identifier for accessing an employee record relating to the request; Element 12: wherein when the request is an update request, the API gateway or the hashing system updates the employee record based on information in the request; Element 13: wherein after an update, the hashing system computes a new cryptographic hash of the updated employee record and a new unique content identifier for storage in the blockchain network, and wherein a further transaction is generated which provides the new cryptographic hash of the updated employee record and the new unique content identifier to a smart contract and the smart contract executes to record the update for the transaction on the ledger; Element 14: wherein the employee performance data includes a score representative of employee performance at different employers; Element 15: wherein the host further includes a scoring algorithm configured to analyze employee data in an employee record covering employment at multiple employers including performance metrics, qualitative and quantitative data, or other parameters and generate a standardized score representative of the employee performance during the employment at multiple employers; Element 16: wherein the scoring algorithm performs the following operations using at least one processor: assigns scores to multiple data categories relating to an employee record; adds weights to the scores for the assigned data categories and generates an aggregate score; and rescales the aggregate score to obtain a final score for output; Element 17: wherein the host further includes a reporting system, appeal system, hash validator, data entry system, data scheduler, and verification system, and a payment system coupled to a payment processor; and Element 18: wherein the application on the client device is further configured to enable an employee to view or obtain corresponding performance reports or input updated data related to employee profile or performance.

Embodiments described herein are illustrative and not intended to be limiting. Embodiments may include data policies and procedures for anonymizing personal data and safeguarding personal data in accordance with national, state, local or other governing law or policy.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second."

Also, as used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A system comprising:
a host implemented on at least one processor and configured to synchronize employee performance data in an employee record for an employee obtained from multiple employers over a data network, wherein the employee record is stored on a distributed database implemented on one or more first nodes; and
a client device, coupled to the host, wherein the client device includes an application configured to communicate with the host and enable a requestor to access the employee performance record, wherein
the host is to:
receive from the client device a request for the employee record of the requestor;
validate access to the employee record using an automated contract deployed on a blockchain, the automated contract being used to determine whether the requestor should be granted access to the employee record in response to the request, wherein the blockchain is implemented on a blockchain network comprising one or more second nodes;
receive the employee record or data from the employee record from the one or more first nodes in response to the automated contract on the blockchain network granting access to the employee record; and
communicate a reply with the data from the employee record or the employee record to the client device.

2. The system of claim 1, wherein the automated contract is an electronic smart contract, the electronic smart contract defining functions that can be performed on the blockchain network including creating accessing, modifying or updating the employee record.

3. The system of claim 2, further comprising the distributed database, wherein the distributed database comprises a distributed storage database having a distributed file system configured to address the data of the employee record or the employee record based on a content identifier (CID) generated based on a hash of the data of the employee record or the employee record.

4. The system of claim 3, wherein the host further includes a hashing system, and wherein the hashing system is configured to:
hash the data of the employee record or the employee record to provide hashed data using a cryptographic function; and
generate the CID for the data of the employee record or the employee record based on a hash of the hashed data, and wherein the CID is stored on the blockchain network.

5. The system of claim 2, wherein the host further includes an application program interface (API) gateway to evaluate a type of request provided by the requestor and send a transaction based on the determined type of request to the electronic smart contract on the blockchain network for validation of access to the employee record.

6. The system of claim 5, wherein the smart contract executes logic to validate the request based on the transaction, and when validated, sends a validation reply indicating that the requestor is authorized to make the request along with a cryptographic hash of a node address and a content identifier (CID) for accessing the employee record on the distributed database.

7. The system of claim 6, wherein the request is an update request, and the API gateway or a hashing system of the host updates the data of the employee record to provide an updated employee record based on information in the request.

8. The system of claim 7, wherein in response to updating the data of the employee record, the hashing system computes a new cryptographic hash of the updated employee record and a new CID for storage in the blockchain network, and wherein a second transaction is generated which provides the new cryptographic hash of the updated employee record and the new CID to the electronic smart contract and the electronic smart contract executes to record the update for the second transaction.

9. The system of claim 1, wherein the host further comprises an application program interface (API) gateway to control access between applications on multiple client devices making requests to the host for the data of the employee record or the employee record, and to distribute the requests across different nodes of the blockchain network to distributed workload among the one or more second nodes of the blockchain network.

10. The system of claim 1, wherein the employee record includes a score representative of a performance of the employee at different employers.

11. The system of claim 10, wherein the host further includes a scoring algorithm configured to analyze the employee record covering employment at multiple employers including performance metrics, qualitative and quantitative data, or other parameters to generate the score.

12. The system of claim 11, wherein the scoring algorithm is to:
assigns scores to multiple data categories relating to the employee record;
adds weights to the scores for the assigned data categories to generate an aggregate score; and
rescales the aggregate score to obtain the score.

13. The system of claim 12, wherein the host includes a score job scheduler to cause the scoring algorithm to periodically compute the score for the employee to provide an up-to-date performance evaluation of the employee.

14. The system of claim 11, wherein the data from the employee record or the employee record is provided in an employee performance report and the host further includes a payment system to receive a payment request from the client device and communicate with a payment processor to complete a payment for the employee performance report and/or the score.

15. The system of claim 1, wherein the distributed database uses an InterPlanetary File System (IPFS) protocol, and the host is configured with IPFS functionality for managing the request for the data of the employee record or the employee record.

16. The system of claim 1,
wherein the host is to hash using a cryptographic hash function the data of the employee record or the employee record to provide hashed data, the hashed data being stored on at least one node of the one or more first nodes, and
wherein a content identifier (CID) is used to identify the hashed data, and the host is to provide the CID to the distributed database to request the hashed data based on the request from the client device.

17. The system of claim 16, wherein the CID is a hash of content of the data of the employee record or the employee record, and the CID is an address for the hashed data on the one or more first nodes.

18. The system of claim 16, wherein the CID is stored in a distributed hash table (DHT) that the host can access to identify which node of the one or more first nodes on which the data of the employee record or the employee record is stored.

19. The system of claim 16, wherein the host is to record the hash of the hashed data and/or the CID on the blockchain to establish a verifiable record of the data of the employee record.

20. The system of claim 19, wherein the host comprises a hash validator to compare the recorded hash on the blockchain to a current hash of the hashed data of the data of the employee record or the employee record to determine whether the data of the employee record or the employee record has been tampered with or has been corrupted.

21. A computer-implemented method for managing employment history on a cloud computing platform implemented on at least one processor, comprising:

enabling multiple entities to enter employment data on the platform during respective employment periods of an employee;

storing the employment data for the employee on a distributed database to provide an employee record for the employee, wherein the distributed database implemented on one or more first nodes;

receiving from a client device a request for the employee record;

validating access to the employee record using an automated contract deployed on a blockchain, the automated contract being used to determine whether the request should be granted for the employee record, wherein the blockchain is implemented on a blockchain network comprising one or more second nodes;

receiving the employee record or data from the employee record from the one or more first nodes in response to the automated contract on the blockchain network granting access to the employee record;

calculating a score based the stored employment data; and generating a report including the data from the employee record or the employee record, and the calculated score for output by the platform to a requesting entity; and communicating the report to the client device.

\* \* \* \* \*